US012541608B1

(12) United States Patent
Chacko et al.

(10) Patent No.: US 12,541,608 B1
(45) Date of Patent: Feb. 3, 2026

(54) MODIFYING FONTS FOR OBFUSCATING TEXT AND VIEWING OBFUSCATED TEXT

(71) Applicant: Monotype Imaging Inc., Woburn, MA (US)

(72) Inventors: Ninan Chacko, New York, NY (US); Venkateswarlu Yetrintala, Palatine, IL (US); Atilla Korap, Karben (DE)

(73) Assignee: Monotype Imaging Inc., Woburn, MA (US)

( * ) Notice: Subject to any disclaimer, the term of this patent is extended or adjusted under 35 U.S.C. 154(b) by 277 days.

(21) Appl. No.: 18/210,891

(22) Filed: Jun. 16, 2023

Related U.S. Application Data

(60) Provisional application No. 63/352,703, filed on Jun. 16, 2022.

(51) Int. Cl.
G06F 21/62 (2013.01)
(52) U.S. Cl.
CPC .................. G06F 21/6209 (2013.01)
(58) Field of Classification Search
CPC .................................. G06F 21/6209
See application file for complete search history.

(56) References Cited

U.S. PATENT DOCUMENTS

| 5,832,087 | A | 11/1998 | Hawthorne | |
| 6,631,482 | B1 * | 10/2003 | Marks | G06F 21/6245 714/38.14 |
| 7,194,624 | B1 | 3/2007 | Harris | |
| 8,806,200 | B2 | 8/2014 | Baskaran | |
| 8,909,925 | B2 | 12/2014 | Baskaran | |
| 9,015,483 | B2 | 4/2015 | Baskaran | |
| 9,118,660 | B2 | 8/2015 | Baskaran | |
| 9,124,641 | B2 | 9/2015 | Baskaran | |
| 9,571,469 | B2 | 2/2017 | Baskaran | |
| 10,044,509 | B1 * | 8/2018 | Kirshner | H04L 63/045 |
| 10,579,809 | B2 | 3/2020 | Baskaran | |

(Continued)

OTHER PUBLICATIONS

Azuremarketplace.com [online], "Data Protection with Netskope and MIP," available on or before Sep. 28, 2016, retrieved on Oct. 29, 2024, retrieved from URL<https://azuremarketplace.microsoft.com/en-us/marketplace/apps/netskope.netskope_aip?tab-Overview>, 2 pages.

(Continued)

Primary Examiner — Simon P Kanaan
(74) Attorney, Agent, or Firm — Fish & Richardson P.C.

(57) ABSTRACT

A system includes a computing device that includes a memory configured to store instructions. The system also includes a processor to execute the instructions to perform operations that include receiving data representing characters of a font present in an electronic communication. The data includes an integer code for each character of the font. Operations also include applying an operator to the integer code of each character of the font to produce an encrypted integer code. The respective character of the font is assigned to the encrypted integer code. Operations also include sending an encrypted font file comprising data representing each character of the font and the respective encrypted integer code, the encrypted font file being sent to one or more recipient computing devices for rendering the electronic communication using the encrypted font file.

29 Claims, 32 Drawing Sheets

(56) References Cited

U.S. PATENT DOCUMENTS

| | | | |
|---|---|---|---|
| 2002/0165912 A1* | 11/2002 | Wenocur | H04L 51/00 709/203 |
| 2008/0118150 A1* | 5/2008 | Balakrishnan | G06F 21/6254 382/176 |
| 2008/0301431 A1 | 12/2008 | Hea | |
| 2010/0257354 A1* | 10/2010 | Johnston | H04L 63/0428 713/153 |

OTHER PUBLICATIONS

Azuremarketplace.com [online], "HaloCAD—Information Protection for CAD," available on or before Jun. 13, 2021, via Internet Archive: Wayback Machine URL<https://azuremarketplace.microsoft.com/en-us/marketplace/apps/secudeinternationalag1579872706724.secude_halocad?tab=Overview>, retrieved on Oct. 28, 2024, retrieved from URL<https://azuremarketplace.microsoft.com/en-us/marketplace/apps/secudeinternationalag1579872706724.secude_halocad?tab=Overview>, 2 pages.

Azuremarketplace.com [online], "HaloCORE—Information Protection for SAP," available on or before Mar. 24, 2022, retrieved on Oct. 29, 2024, retrieved from URL<https://azuremarketplace.microsoft.com/en-us/marketplace/apps/secudeinternationalag1579872706724.secude_halocore?tab=Overview>, 2 pages.

Computerworld.com [online], "As Google moves to reshape Workspace, barriers to business adoption remain," Oct. 18, 2021, retrieved on Oct. 28, 2024, retrieved from URL<https://www.computerworld.com/article/3637079/as-google-moves-to-reshape-workspace-barriers-to-business-adoption-remain.html>, 7 pages.

Docs.microsoft.com [online], "Create and configure sensitivity labels and their policies," available on or before May 27, 2020, via Internet Archive: Wayback Machine URL<https://web.archive.org/web/20200527052427/https://docs.microsoft.com/en-us/microsoft-365/compliance/create-sensitivity-labels?view-o365-worldwide>, retrieved on Oct. 29, 2024, retrieved from URL<https://docs.microsoft.com/en-us/microsoft-365/compliance/create-sensitivity-labels?view-o365-worldwide>, 5 pages.

En.wikipedia.org [online], "Substitution cipher," available on or before Mar. 23, 2020, via Internet Archive: Wayback Machine URL<https://web.archive.org/web/20200323184751/https://en.wikipedia.org/wiki/Substitution_cipher>, retrieved on Oct. 28, 2024, retrieved from URL<https://en.wikipedia.org/wiki/Substitution_cipher>, 6 pages.

Gartner.com [online], "Hype Cycle for Privacy, 2021," Jul. 13, 2021, retrieved on Oct. 28, 2024, retrieved from URL<https://www.gartner.com/en/documents/4003504-hype-cycle-for-privacy-2021>, 4 pages.

Gartner.com[online], "Gartner Says Worldwide PC Shipments Grew 32% in First Quarter of 2021," Apr. 12, 2021, retrieved on Oct. 28, 2024, retrieved from URL<https://www.gartner.com/en/newsroom/press-releases/2021-04-12-gartner-says-worldwide-pc-shipments-grew-32-percent-in-first-quarter-of-2021>, 4 pages.

Learn.microsoft.com [online], "Extend sensitivity labeling on Windows," available on or before Oct. 31, 2020, via Internet Archive: Wayback Machine URL<https://web.archive.org/web/20201031111611/https://docs.microsoft.com/en-us/azure/information-protection/rms-client/clientv2-admin-guide-file-types>, retrieved on Oct. 29, 2024, retrieved from URL<https://docs.microsoft.com/en-us/azure/information-protection/rms-client/clientv2-admin-guide-file-types>, 8 pages.

Makeuseof.com [online], "Microsoft 365 Now Boasts Over 50 Million Subscribers," Apr. 29, 2021, retrieved on Oct. 28, 2024, retrieved from URL<https://www.makeuseof.com/microsoft-365-passes-50-million-subscribers/>, 8 pages.

Microsoft.com [online], "Microsoft surpasses $10 billion in security business revenue, more than 40 percent year-over-year growth," Jan. 27, 2021, retrieved on Oct. 28, 2024, retrieved from URL<https://www.microsoft.com/security/blog/2021/01/27/microsoft-surpasses-10-billion-in-security-business-revenue-more-than-40-percent-year-over-year-growth/>, 4 pages.

Office365itpros.com [online], "Office 365 Insights from Microsoft's FY21 Q2 Results," Jan. 28, 2021, retrieved on Oct. 28, 2024, retrieved from URL<https://office365itpros.com/2021/01/28/office-365-insights-microsoft-fy21q2-results/>, 5 pages.

Office365itpros.com [online], "Office 365 Reaches 180 Million Monthly Active Users," Apr. 25, 2019, retrieved on Oct. 28, 2024, retrieved from URL<https://office365itpros.com/2019/04/25/office-365-reaches-180-million-users/>, 7 pages.

Seclore.com [online], "Get Ahead with Classification Add Data Protection to Microsoft's Sensitivity Labels," available on or before Nov. 5, 2021, via Internet Archive: Wayback Machine URL<https://web.archive.org/web/20211105102853/https://www.seclore.com/microsoft-sensitivity-labels/>, retrieved on Oct. 28, 2024, retrieved from URL<https://www.seclore.com/microsoft-sensitivity-labels/>, 6 pages.

Techtarget.com [online], "Azure Information Protection P1 vs. P2: What's the difference?," Jan. 29, 2021, retrieved on Oct. 28, 2024, retrieved from URL<https://www.techtarget.com/searchwindowsserver/tip/Azure-Information-Protection-P1-vs-P2-Whats-the-difference>, 5 pages.

Müller et al., "Practical Decryption exFiltration: Breaking PDF Encryption," CCS '19: Proceedings of the 2019 ACM SIGSAC Conference on Computer and Communications Security, London, United Kingdom, Nov. 11-15, 2019, pp. 15-29.

* cited by examiner

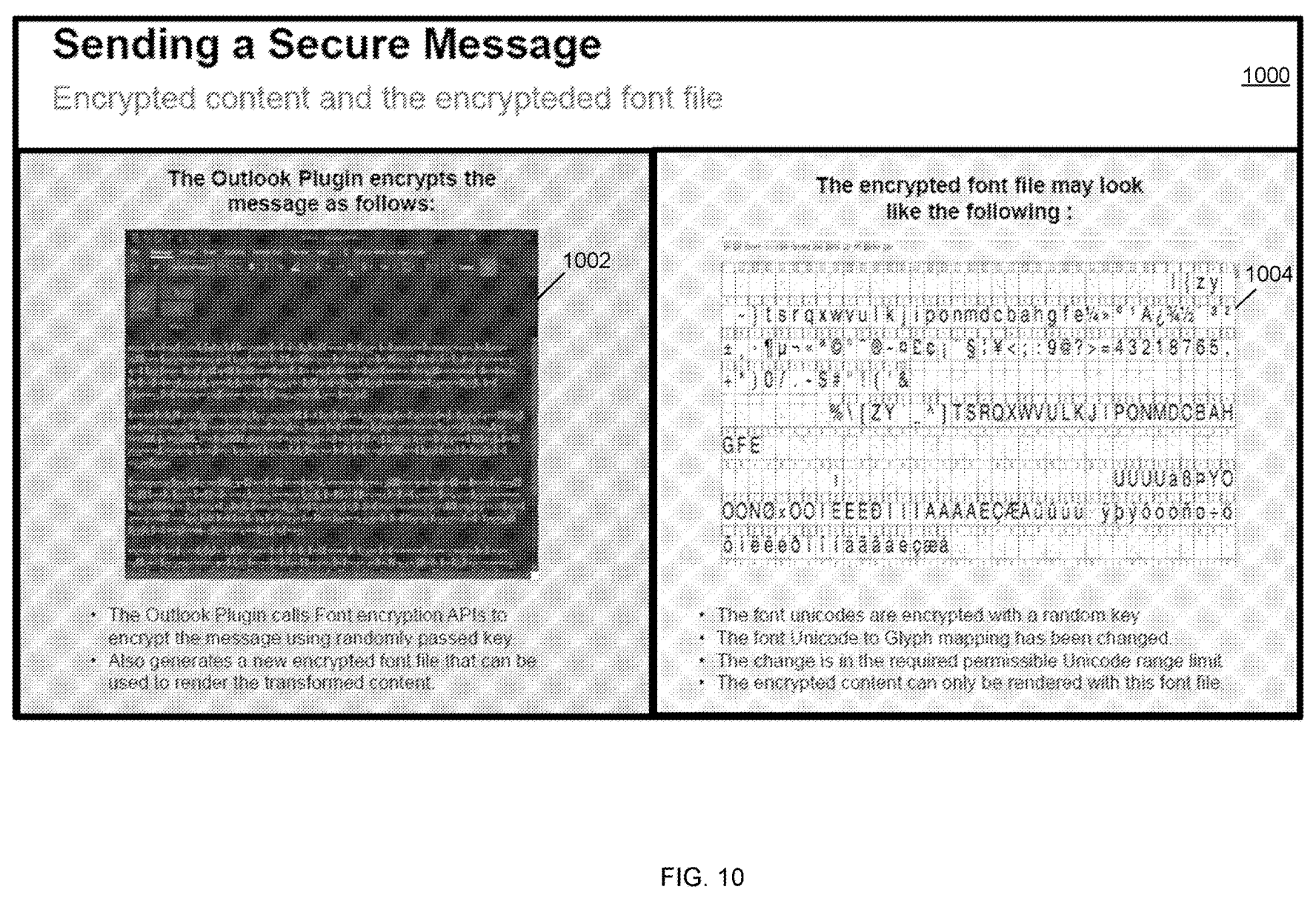

Sending a Secure Message

*Encrypted content and the encrypteded font file*

The Outlook Plugin encrypts the message as follows:

The encrypted font file may look like the following:

- The Outlook Plugin calls Font encryption APIs to encrypt the message using randomly passed key. Also generates a new encrypted font file that can be used to render the transformed content.

- The font unicodes are encrypted with a random key
- The font Unicode to Glyph mapping has been changed
- The change is in the required permissible Unicode range limit
- The encrypted content can only be rendered with this font file

FIG. 10

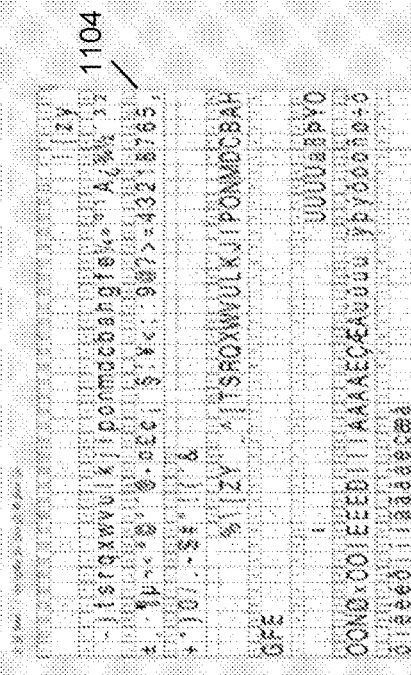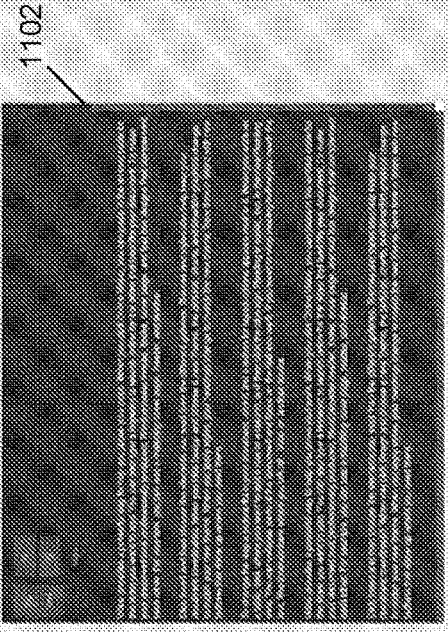
FIG. 11

FIG. 17
Current implementation: Single Unicode Single Glyph

FIG. 19B

MODIFYING FONTS FOR OBFUSCATING TEXT AND VIEWING OBFUSCATED TEXT

CLAIM OF PRIORITY

This application claims priority under 35 USC § 119(e) to U.S. Patent Application Ser. No. 63/352,703, filed on Jun. 16, 2022, the entire contents of which are hereby incorporated by reference.

BACKGROUND

This description relates to modifying a font or fonts for obfuscating text for non-intended recipients of an electronic communication. With proper authorization, intended recipients can employ a provided encrypted font file to properly view the text.

To allow only authorized viewers access to a readable form of text, as intended by the sender of the text, encryption techniques can be employed. In general, an encryption process converts an original representation (e.g., referred to as plaintext) of the textual information into an alternative form (e.g., referred to as ciphertext). Ideally, only the authorized viewers can decipher the alternative form of the text (e.g., the ciphertext) back to the original information form (e.g., the plaintext). If the encryption technique operates properly, an intended viewer is provided access to the original textual information while non-intended viewers (e.g., would-be interceptors) are denied access of the original text.

SUMMARY

The systems and techniques described allow text (e.g., plaintext) to be converted (e.g., by an encryptor) into an obfuscated text and create a corresponding font that allows any recipient of the font to view the converted text (e.g., ciphertext). The encrypted text can be made available to any individual (e.g., through operations of the encryptor), however, only the obfuscated text is only legible by employing with the created font. By controlling access to the created font, an individual or individuals can be determined (e.g., by the encryptor) that are allowed to view the plaintext. The obfuscation can be employed with any text (e.g., with complete documents), however, portions of a document can also be protected (by the encryptor) against unauthorized access.

In one aspect, a computing device implemented method includes receiving data representing characters of a font present in an electronic communication. The data includes an integer code for each character of the font. The method also includes applying an operator to the integer code of each character of the font to produce an encrypted integer code. The respective character of the font is assigned to the encrypted integer code. The method also includes sending an encrypted font file comprising data representing each character of the font and the respective encrypted integer code. The encrypted font file is sent to one or more recipient computing devices for rendering the electronic communication using the encrypted font file.

Implementations may include one or more of the following features. The operator may be a binary operator that uses an integer key to produce the encrypted integer code. The integer code for each character of the font may be an integer number representing a Unicode. The electronic communication may be an electronic document, an electronic mail message, a social media posting, etc. The binary operator may represent an exclusive OR binary operation, another logical operation, and/or a combination of logical operations. The integer key may be an integer number and the binary operator maps the integer code of each character of the font to the encrypted integer code. One or more recipients may be authenticated prior to the encrypted font file being sent. A sender of the electronic communication may select each of the one or more recipients for delivery of the electronic communication. The sender of the electronic communication may select a portion of the electronic communication to be readable by one or more of the recipients. A plug-in executed by a computing device of the sender may receive data representing the one or more recipients to receive the encrypted font file for presenting the electronic communication.

In another aspect, a system includes a computing device that includes a memory configured to store instructions. The system also includes a processor to execute the instructions to perform operations that include receiving data representing characters of a font present in an electronic communication. The data includes an integer code for each character of the font. Operations also include applying an operator to the integer code of each character of the font to produce an encrypted integer code. The respective character of the font is assigned to the encrypted integer code. Operations also include sending an encrypted font file comprising data representing each character of the font and the respective encrypted integer code. The encrypted font file is sent to one or more recipient computing devices for rendering the electronic communication using the encrypted font file.

Implementations may include one or more of the following features. The operator may be a binary operator that uses an integer key to produce the encrypted integer code. The integer code for each character of the font may be an integer number representing a Unicode. The electronic communication may be an electronic document, an electronic mail message, a social media posting, etc. The binary operator may represent an exclusive OR binary operation, another logical operation, and/or a combination of logical operations. The integer key may be an integer number and the binary operator maps the integer code of each character of the font to the encrypted integer code. One or more recipients may be authenticated prior to the encrypted font file being sent. A sender of the electronic communication may select each of the one or more recipients for delivery of the electronic communication. The sender of the electronic communication may select a portion of the electronic communication to be readable by one or more of the recipients. A plug-in executed by a computing device of the sender may receive data representing the one or more recipients to receive the encrypted font file for presenting the electronic communication.

In another aspect, one or more computer readable media store instructions that are executable by a processing device, and upon such execution cause the processing device to perform operations including receiving an image that includes textual content in at least one font. Operations also include receiving data representing characters of a font present in an electronic communication. The data includes an integer code for each character of the font. Operations also include applying an operator to the integer code of each character of the font to produce an encrypted integer code. The respective character of the font is assigned to the encrypted integer code. Operations also include sending an encrypted font file comprising data representing each character of the font and the respective encrypted integer code. The encrypted font file is sent to one or more recipient computing devices for rendering the electronic communication using the encrypted font file.

Implementations may include one or more of the following features. The operator may be a binary operator that uses an integer key to produce the encrypted integer code. The integer code for each character of the font may be an integer number representing a Unicode. The electronic communication may be an electronic document, an electronic mail message, a social media posting, etc. The binary operator may represent an exclusive OR binary operation, another logical operation, and/or a combination of logical operations. The integer key may be an integer number and the binary operator maps the integer code of each character of the font to the encrypted integer code. One or more recipients may be authenticated prior to the encrypted font file being sent. A sender of the electronic communication may select each of the one or more recipients for delivery of the electronic communication. The sender of the electronic communication may select a portion of the electronic communication to be readable by one or more of the recipients. A plug-in executed by a computing device of the sender may receive data representing the one or more recipients to receive the encrypted font file for presenting the electronic communication.

These and other aspects, features, and various combinations may be expressed as methods, apparatus, systems, means for performing functions, program products, etc.

Other features and advantages will be apparent from the description and the claims.

DESCRIPTION OF DRAWINGS

FIG. 10 illustrates a secure representation of exemplary text content (of FIG. 9) based on an encrypted font file.

FIG. 11 illustrates the exemplary text content (of FIG. 9) being presented using an encrypted font file provided to an intended recipient.

FIG. 17 illustrates using a single Unicode mapping to secure an electronic communication.

FIG. 19B is a chart that illustrates mapping single glyphs to multiple Unicodes.

FIG. 22 is a flow chart of operations for viewing a communication at a recipient computing device having or not having an add-in.

FIG. 24 is a flow chart of operations for accessing selectively protected text absent an add-in.

DETAILED DESCRIPTION

Figure 1A:
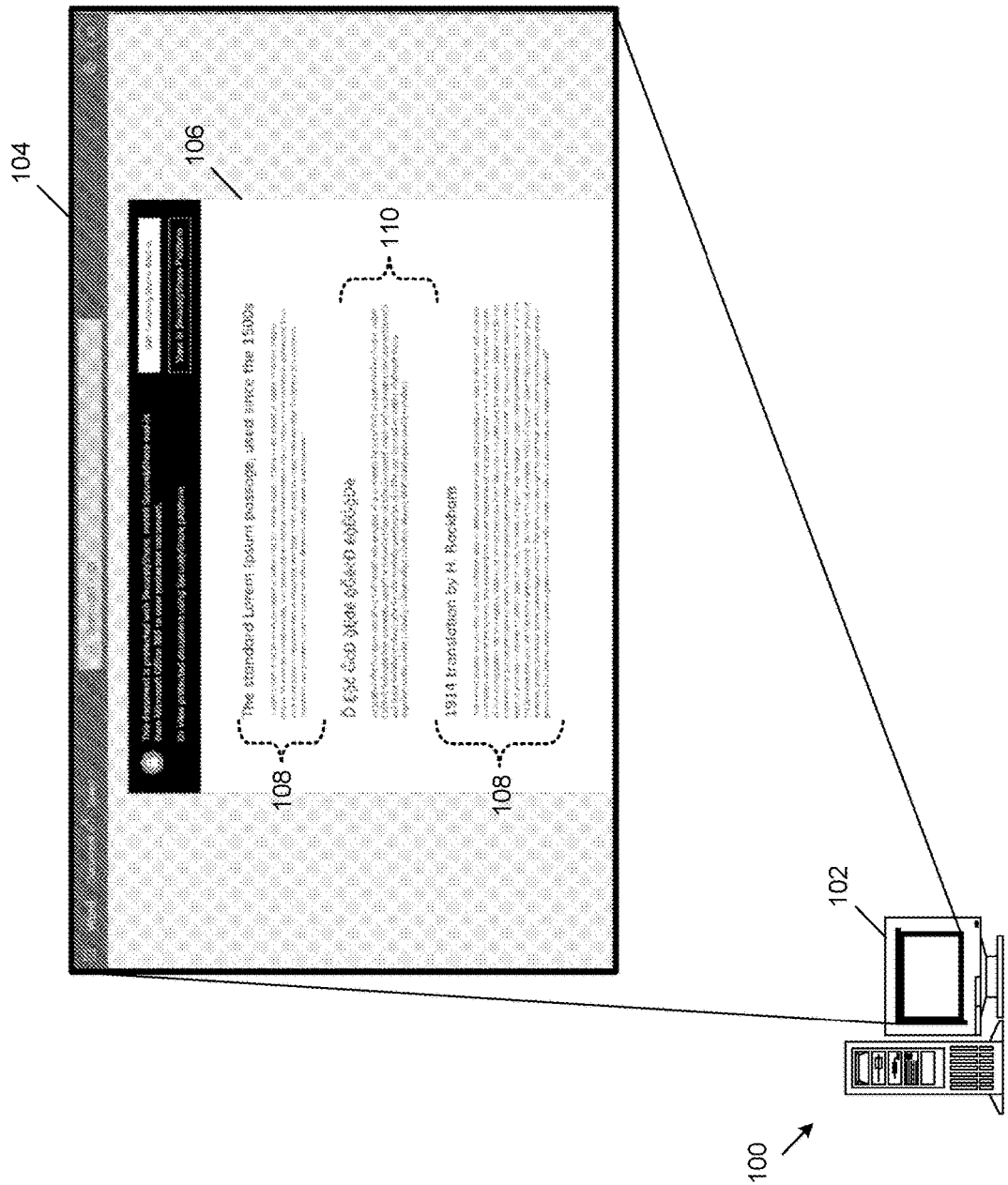
FIG. 1A illustrates a computer executing an application that uses fonts to secure portions of an electronic communication.

Referring to FIG. 1A, a computing device (e.g., computer system 100) presents (on a display 102) an interface 104 that allows a user to create, review, edit, etc. textual content (e.g., text) and secure the textual content that is included in electronic communications. To secure the textual content in the electronic communications (e.g., electronic documents such as Microsoft Word documents, electronic mail messages, social media communications, etc.), font data provides security so a readable version of the text is rendered to an intended recipient (or recipients) and an unreadable version provided to unintended recipients.

Conventional security techniques secure text content by encrypting an entire communication (e.g., an entire electronic document, email message, social media communication, etc.) and encryption technology is used by the sender prior to sending the communication, and decryption technology is employed at a recipient (e.g., a recipient's computing device) to attain the originally created textual content for review. As such, operations associated with security of the entire electronic communications are executed at both the sender and recipient computing devices.

Securing an entire electronic communication can often lead to inefficient transmission of the secure information; for example, if multiple recipients are to review different portions of the document—multiple versions of a secure electronic document will need to be created, transmitted separately, etc. The creator/sender of a document may intend to allow one recipient to review one portion of the document (e.g., a group of paragraphs) and a second recipient to review a separate portion of the document (e.g., a difference group of paragraphs). To provide the respective portions of the document, the creator/sender would create two separate versions of the electronic document, separately store the two document versions, and separately send the two documents to the respective recipient. Along with requiring additional computational resources to prepare the separate documents (e.g., storage space, computational operations, etc.) additional data transmission resources are needed (e.g., multiple e-mail messages, network bandwidth, etc.). Additionally, exchanging multiple versions of a document can increase communication traffic (e.g., email traffic) and potentially increase the probability of improper transmissions (e.g., sending a document version to one or more unintended recipients).

By allowing a creator/sender of an electronic communication (e.g., electronic document, email, social media posting, etc.) to separately secure different portions of the communication, a single version of communication can be sent to multiple recipients, thereby improving efficiency (e.g., use less computational resources, data communication resources, etc.). Further by separately securing the different portions of the communication (e.g., a group of paragraphs, sentences, individual words—such as a person's name or other personal information), multiple recipients can be granted permission to review only the portion (or portions) of the communication as intended by the creator/sender of the communication. One or more techniques can be employed to secure different portions of a communication such that only intended recipients have access to the respective portions. For example, a font or fonts used by the document to present the textual content can be used to provide security. In one implementation, one or more fonts can be modified so the modified font (or fonts) can be embedded in an electronic communication and the modified font (or fonts) can be provided to a recipient (or recipients) of the communication. By providing the modified font to the recipient(s) in a secure manner, the modified font can be used in recipient's work environment (e.g., to present a portion or portions of the communication intended for the recipient). By using fonts to secure textual content of electronic communications, this technology can (a) authenticate the content of communication with particular font software, (b) enable selective privacy through encryption of fonts and textual content, (c) secure and verify electronic content, (d) prevent accidental content leaks, (e) secure communication through several channels, etc.

Through this technology, a process can be provided to encrypt a text communication or portions of the communication with particular font software, securely share the font software with an authorized recipient and allow such recipient to apply the font software (using the recipient's computing device) to read the encrypted content (e.g., using software such as a Microsoft suite—Microsoft Office 365) without needing to decrypt the content. The process allows "encrypted" electronic communications to be shared through channels (e.g., network based communications) without any additional protection and the communication can be sent to multiple recipients since the selected encrypted content can only be read by authorized recipients assigned to the selected content. The process also enables users (e.g., creators, senders, etc.) to define different levels of authorization in one electronic communication (e.g., document) without having to send different documents to recipients with different levels of authorization.

In the illustrated example, an electronic document 106 is presented in the interface 104 (e.g., a word processor window) that has been transmitted to a recipient. The presented document 106 includes portions 108 that the recipient is authorized to view (and is readable in figure) and a portion 110 that the recipient is not authorized to review. For most electronic communications, first, the bulk of the textual content can be non-secretive across parties and only small portions are of privacy concerns. Second, personally identifiable information (PII) is typically a portion of a message and encrypting the PII is enough to encrypt the relevant data rather than encrypting the whole electronic communication (e.g., electronic document). An all-or-none approach is taken to encrypt resulting in multiple copies of a document being needed for distributing to multiple individuals. In such cases, the creator/sender would need to make a copy of the documents, take remediation actions, split the files, send it to recipients, and collate them feedback—which can take considerable time, poses security risks, and still be cumbersome.

By employing cryptographically computed fonts, selective privacy can be provided in which only authorized recipients can access (e.g., view) a portion or portions of the electronic communication as intended by the sender. The fonts in the selective portions of a documents are encoded differently and only users that present the right credentials can use the matching encrypted font files that contain the corresponding encoding for rendering the electronic communication (or corresponding portions of the communication). Only the relevant information that needs to be encrypted can be selectively encoded with a substitution cipher.

One or more techniques may be employed for providing selective privacy for electronic communications (e.g., creating and editing electronic documents, email messages, social postings, spreadsheet, presentations, etc.). These techniques could be employed for network based systems (e.g., internet cloud based systems), user computing devices (e.g., perform operations on a local applications such as native Microsoft Office applications), etc. In one implementation, selective privacy can be provided by one or more software components that add a specific feature to an application or application suite. Such components can be considered plugins that are software add-ons installed on a computer program (e.g., an application) that enhances the computer program capabilities. Such a plugin is generally designed to seamlessly assist users to operate in both cloud and local native applications. With the plugin for selective privacy installed (e.g., on computer system 102), the individual operating the computer system is able to select the portions of electronic communication (e.g., electronic document), assign permissions to recipients and share the document with the recipients to access (e.g., view) the permissions portions. By using these techniques, no copies of the electronic communications (e.g., documents) are created and stored (thereby reducing user time), which reduces the probability that sensitive information is accessed by non-intended recipients.

Figure 1B:
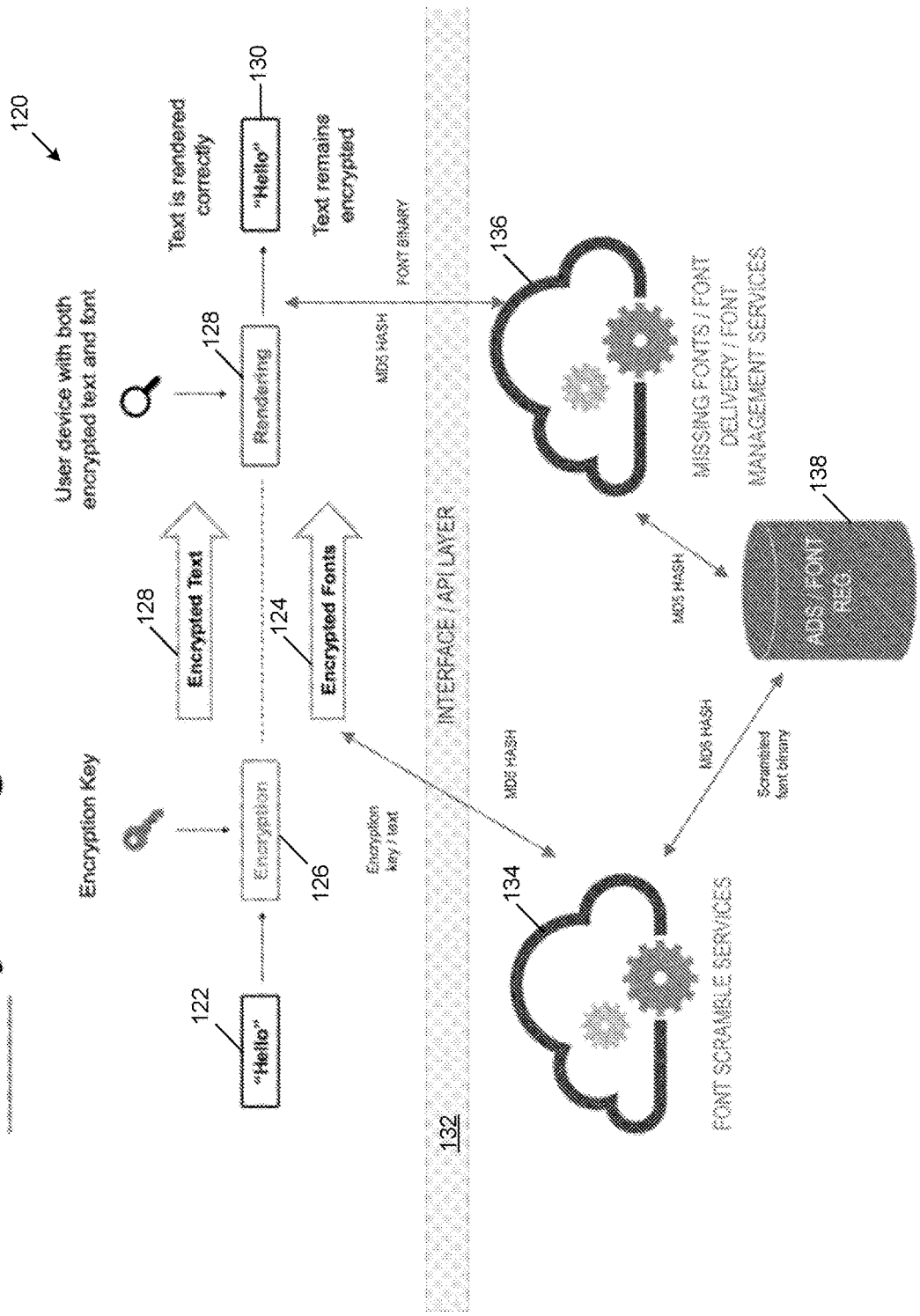
FIG. 1B illustrates a data flow for using fonts to secure electronic communications.

Referring to FIG. 1B, a diagram shows the general data flow 120 that uses one or more fonts to secure the contents of electronic communications. As shown in the figure, a communication 122 (e.g., an email message) is created and one or more encrypted fonts 124 are applied 126 to the communication to create encrypted text 128. Both the encrypted font (or fonts) 124 and the encrypted text 128 are provided to an intended recipient (e.g., to the recipient's device), thereby allowing the device to render 128 the communication using the encrypted font (or fonts) 124 and present the communication to an intended recipient. In this example, data associated with using fonts (to provide selective security) is provided via the Interface/Application Program Interface (API) Layer 132 (e.g., data is exchanged via plug-ins, add-ins, etc.). In this example, a font scramble service 134 provides data associated with the encrypted font (or fonts) to the source of the electronic communication for encrypting the communication, and a font management service 136 provides data to the recipient device (or devices) of the electronic communication. Other architectures are implementable (e.g., the functionality of the font scramble service 134 and font management service 136 may be partially or completely combined. Both the font scramble service 134 and the font management service 136 communicate with one or more storage devices 138 for accessing, storing, etc. font data and other types of information (e.g., binary keys to create encrypted fonts). Various techniques may be employed for exchanging data among the font scramble service 134, the font management service 136, the storage device(s) 138, communication sources and recipients, etc. in the illustrated architecture; for example, techniques for verifying, authenticating, etc. data exchanges (e.g., message-digest algorithm (MD5), etc.) can be employed in this or other architectures that use encrypted fonts for selectively providing electronic communications to intended recipients.

Figure 2:
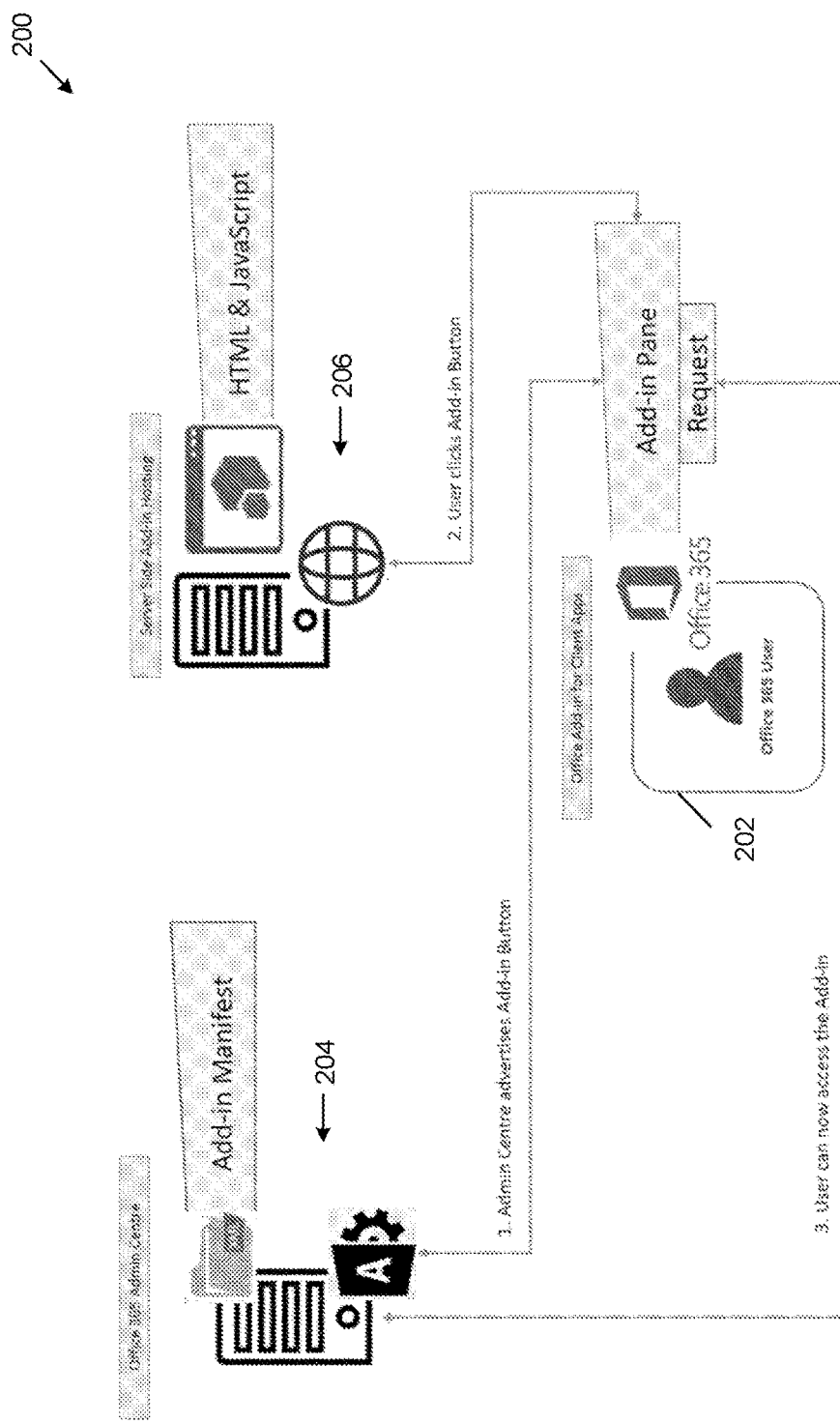
FIG. 2 is a block diagram of an Internet based network that uses fonts to secure electronic communications.

Referring to FIG. 2, a diagram of an Internet based network 200 that demonstrates how software plugins can be used to provide selective privacy to secure electronic communications (e.g., electronic documents). In this example, a user 202 (e.g., a subscriber of an application or suite of applications such as Microsoft Office 365), can download and install a selective privacy plugin from various sources. In one example (e.g., an enterprise environment), the plugin can be pushed seamlessly across an organization in an automatic manner without much assistance needed from the user 202 for installation. For example, an administrative center 204 can present a process (e.g., via an add-in button on an interface) and through interactions, the user 202 can initiate the delivery, installation, etc. of the selective privacy plug-in (e.g., add-in) from a server 206.

Figure 3:
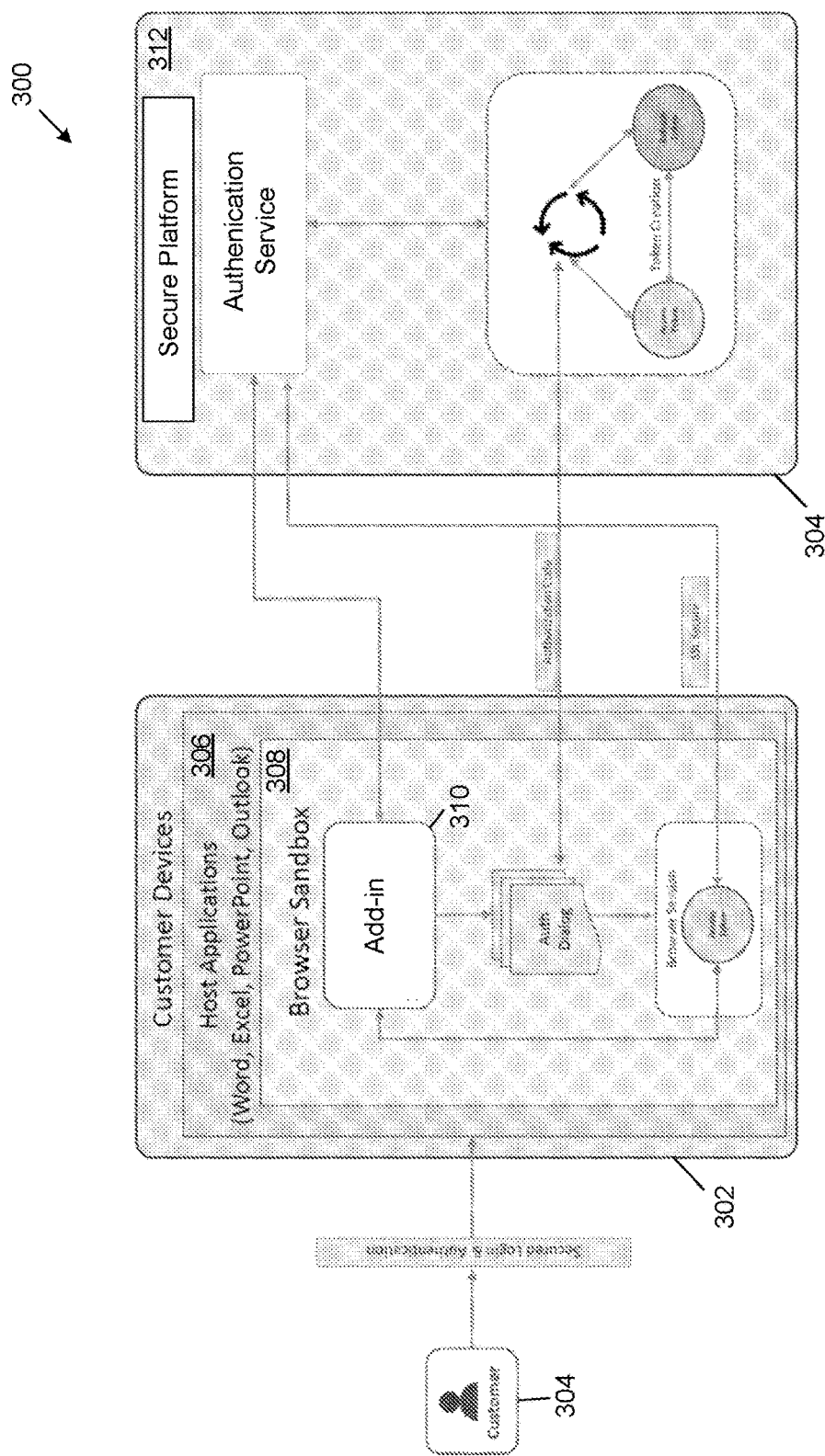
FIG. 3 is a data flow diagram that illustrates securely exchanging data between an end user device and a secure computational platform.

Referring to FIG. 3, a diagram 300 illustrates authentication operations upon the selective privacy plug-in being installed in a computing device 302 (e.g., server) that is accessible by a user 304 (e.g., a sender, recipient, etc. of electronic communications). In this example, the computing device 302 includes applications 306 that are executed (e.g., hosted) by the computing device (e.g., the applications are provided as a service such as software as a service—SaaS). A browser sandbox 308, allows browser-based applications (e.g., applications 306) to be executed in an isolated environment to disrupt (e.g., block) browser-based malware (e.g., block from spreading throughout a network). The sandbox 308 allows for threats to be observed and analyzed in an isolated and safe environment.

Through interactions between the installed selective privacy plug-in (e.g., add-in 310) and a security platform 312 (e.g., a centralized server), the user 304 can be authenticated and then allowed to utilize the selective privacy functionality. In this arrangement, upon being authenticated the security platform 312 creates a token for the user 304 that can be used throughout the user's browser session. In other arrangements, the token can be used beyond a single session (e.g., used for multiple session, extended time periods, etc.) to allow the computing device 302 to identify and recognize the user.

Figure 4:
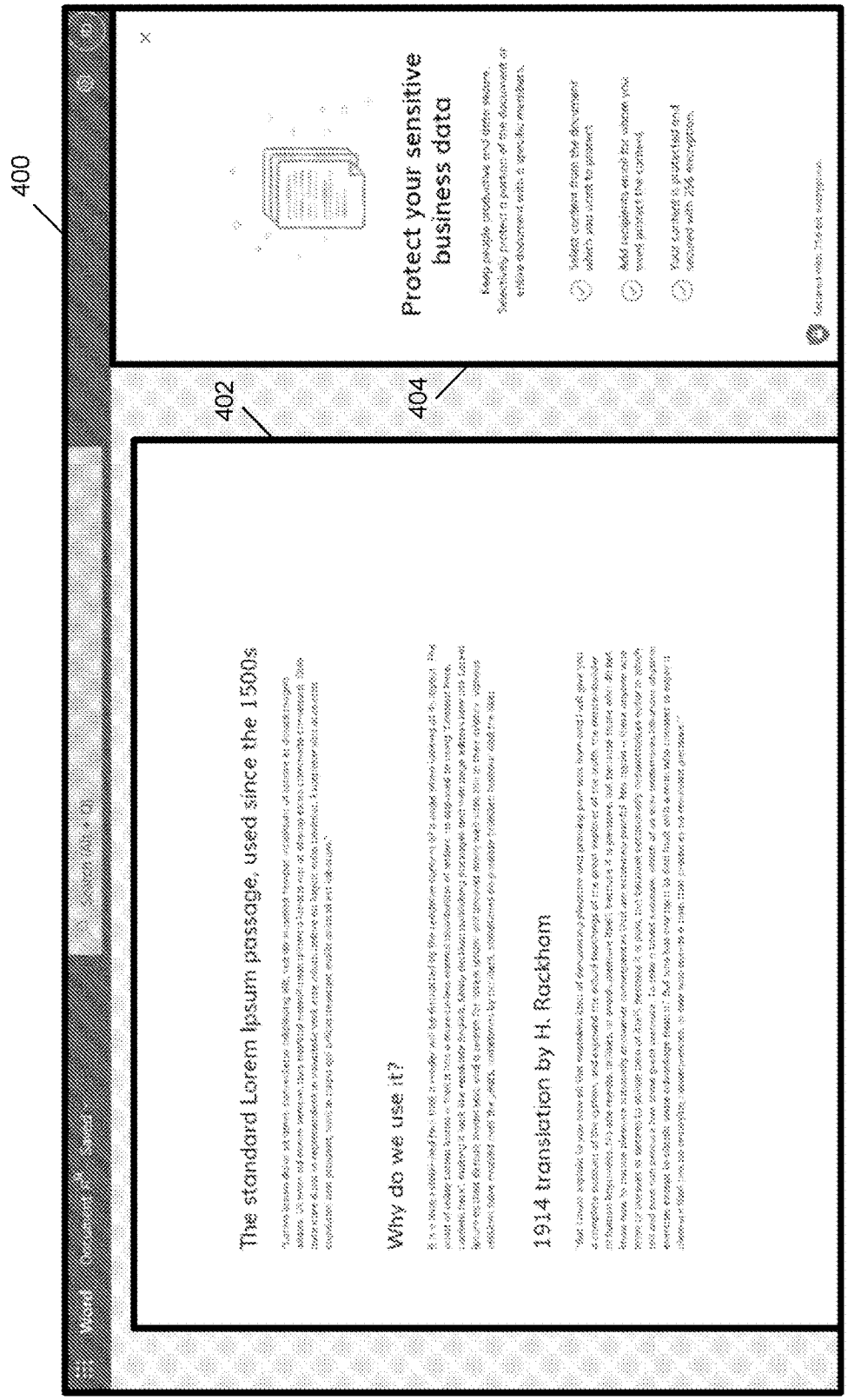
FIG. 4 illustrates an electronic document presented in an interface that allows securing portions of the document.

Referring to FIG. 4, once the add-in 310 is installed and after the user is authenticated, selective privacy can be applied to one or more electronic communications. For example, an electronic document can be created, edited, etc. for applying selective privacy. In the illustrated example, an interface 400 presents an electronic document in a portion 402 of the interface and another portion 404 of the interface presents information about capabilities of the selective privacy add-in 310. Similar interfaces can be used by other types of computational applications to incorporate selective privacy; for example, interfaces for preparing e-mail messages (e.g., e-mail applications such as Microsoft Outlook), social network communications (e.g., Facebook messenger, Facebook post interfaces, etc.), etc. can utilize the selective privacy functionality.

Figure 5:
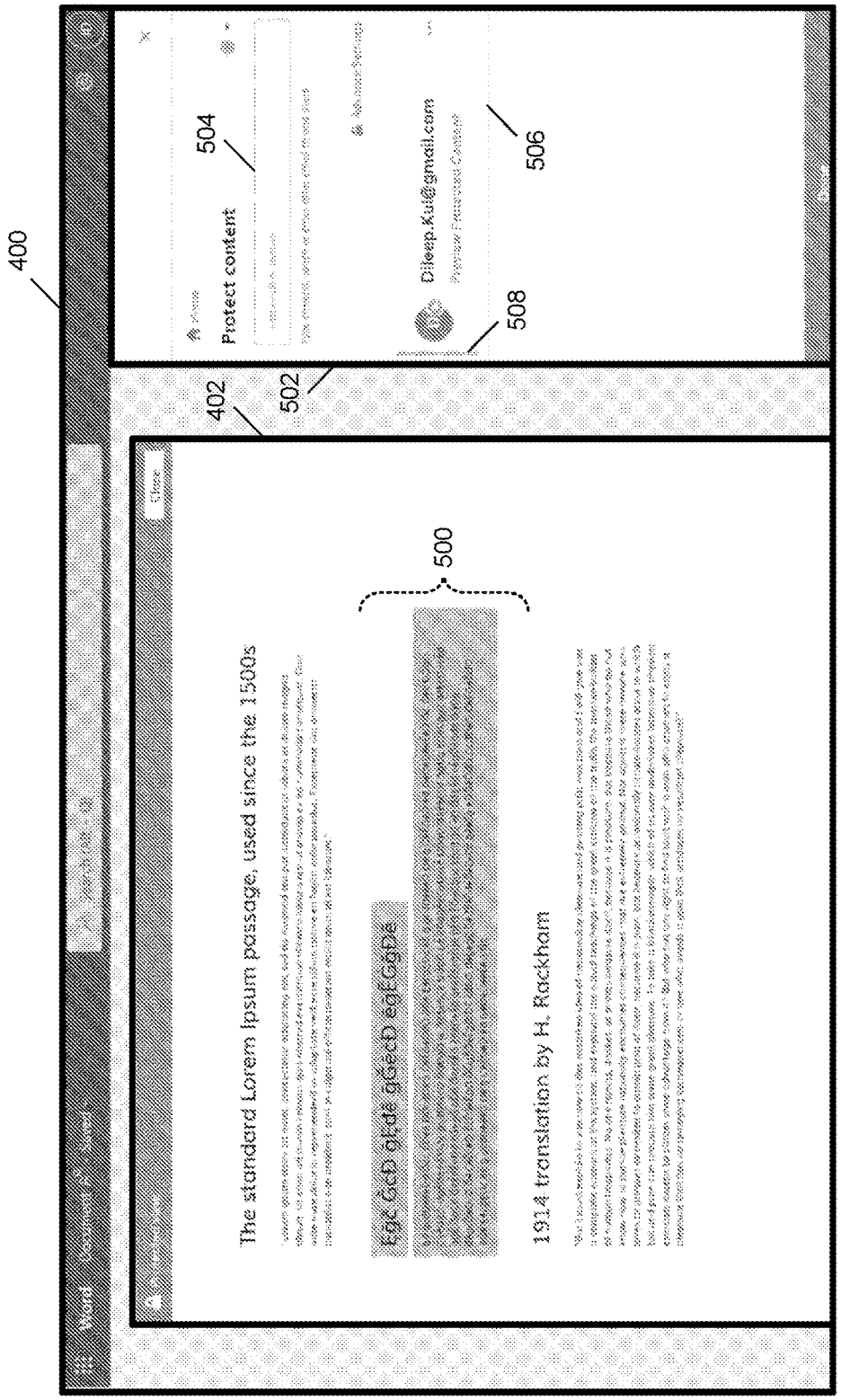
FIG. 5 illustrates using a font to secure a portion of the electronic document of FIG. 4.

Referring to FIG. 5, the interface 400 demonstrates a selection made by the interface user (e.g., by highlighting a paragraph) and a recipient has been selected by the user for viewing the selected text. Various portions of an electronic communication (e.g., an electronic document) may be selected for assigning to a particular viewer or viewers. In this example, a paragraph 500 of the textual content shown in the portion 402 of the interface 400 is illustrated as being selected. Similarly, different paragraphs, multiple paragraphs, the entire document being presented, etc. can be selected from the portion 402 of the interface 400. Once the portion of the document (e.g., the paragraph 500) is selected, the user identifies the recipient or recipients of the document that are authorized to view the selected text. In this example, the add-in (e.g., add-in 310 of FIG. 3) presents an interface 502 that allows the user to insert information (e.g., an email address, mobile telephone number, etc.) to identify a recipient being authorized to review the selected text 500. Once identified, information that represents the selected recipient is presented on the interface 502 (provided by the add-in). In the illustrated example, the email address of the selected is presented a portion 506 of the interface 502 along with additional information; for example a graphical key (e.g., a colored bar 508) shows a relationship of the recipient and the textual content selected for the recipient to view. For example, the graphical key can represent level of authorization (e.g., to view, to view and comment, to view and adjust, etc.).

Figure 6:
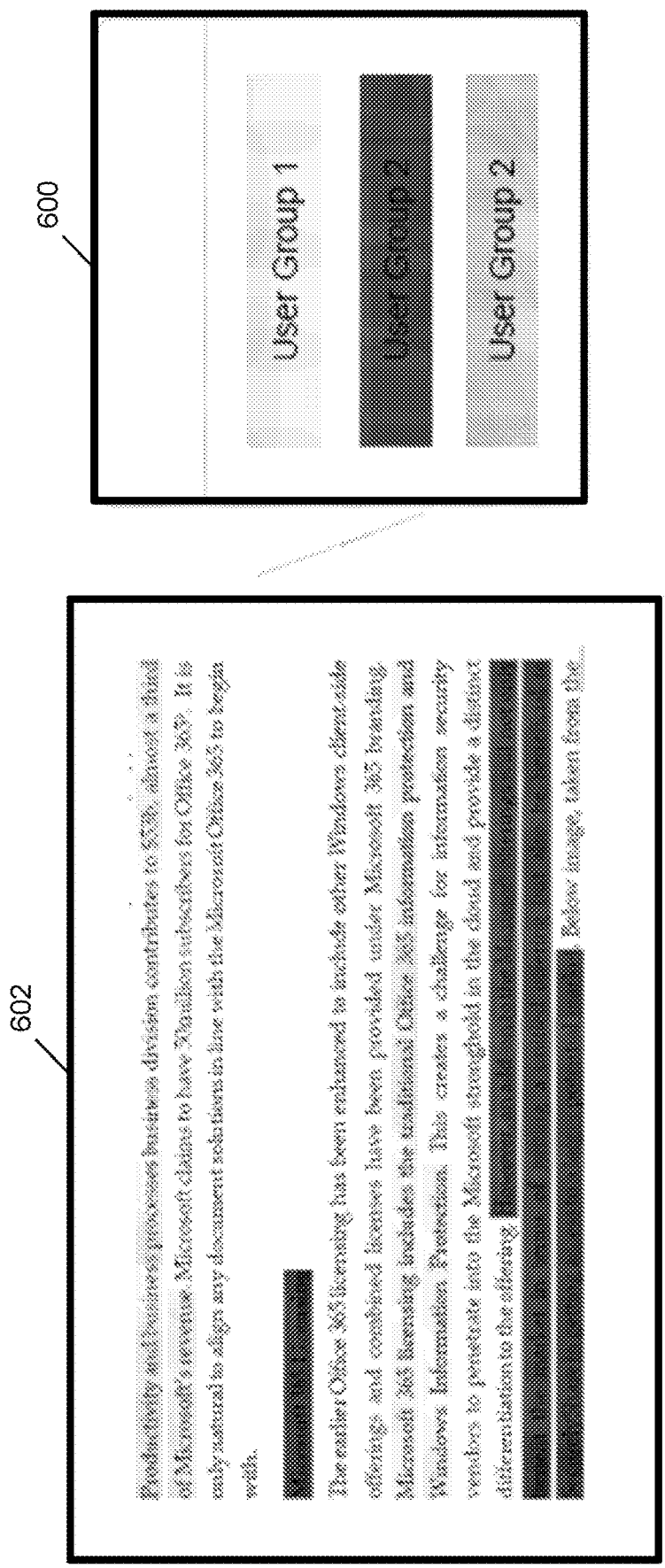
FIG. 6 illustrates fonts being used to secure multiple portions of an electronic documents for different recipient groups.

Referring to FIG. 6, the add-in 310 (shown in FIG. 3) allows for multiple recipients to be selected and assigned to the same or different portions of textual content. For example, two or more recipients can be selected by a user (e.g., via the add-in interface 502) for assigning to one or multiple portions of an electronic communication (e.g., an electronic document). Similar to selecting individual recipients, groups of recipients may be defined and textual content may be selected for assigning to one or more of the recipient groups. As illustrated in the figure, an add-in interface 600 presents three recipients groups (e.g., labeled "User Group 1", "User Group 2", and "User Group 3") and each group may have one or more individual recipients. Once a group and/or groups are defined, portions of text can be selected to which the corresponding recipients groups can view. In this example, the recipient group (labeled "User Group 1") is assigned to the textual content highlighted in one color (i.e., yellow) and the recipient group (labeled "User Group 2") is assigned to the textual content highlighted in another color (i.e., red). As further illustrated in the figure, recipient groups may be defined that are not assigned to portions of the textual content. For example, a third recipient group (labeled "User Group 3") is defined, but no textual content has been selected for assignment to this group. As such, once a sender is authorized, the sender can create, edit, etc. an electronic communication (e.g., an electronic document) and assign selected portions (e.g., paragraphs) to one or more appropriate recipients (e.g., individually, in groups, etc.). Multiple selections can be made by the sender for assigning to a recipient or assigning to multiple recipients (e.g., define a group of multiple recipients and assign the group to a portion or portions of an electronic communication), thereby allowing the same portion of the communication to be shared by multiple recipients.

Once the sender selects the recipient or recipients and assigns them (e.g., to view selected content), the add-in 310 sends the selected content to a centralized computing device (e.g., a server) using one or more data transmission techniques (e.g., application program interface (API) calls). The add-in 310 may also send additional information to the centralized computing device, for example, information such as relevant Meta data including information about the recipient(s) may be sent. The server creates one or more encrypted fonts to render a readable of the corresponding text. The server also creates a secure version of the text, which is returned to the sender. The selected portions of the electronic communication (e.g., the electronic document) are updated to include the secured text (for which the encrypted font or fonts is needed for rendering a readable version). Various processing techniques may be employed to attain the encrypted font or fonts and producing the correspondence secured text from (e.g., a process may be repeated for each of the selected portions). Each selected portion gets its own one or more encrypted fonts. Relationship between the secured content and the corresponding encrypted fonts are maintained at the centralized computing device (e.g., the server), a connected computing device (e.g., another server), etc.

Upon receiving the information from the centralized computing device, the sender can complete the "Selective Privacy" process and finalize the electronic document. The document can be shared with the recipients by employing one or more techniques without any restrictions upon the mode of transport. For example, the electronic document can be shared via one of more functions of the application used to create, edit, etc. the document (e.g., via a "share" function of Microsoft Office such as Microsoft Office 365), separate applications can be employed such as file transfer software (e.g., uploading the document to one or more recipients), electronic message software such as e-mail software platforms, software for sharing data on a storage device (e.g., OneDrive, etc.).

Figure 7:
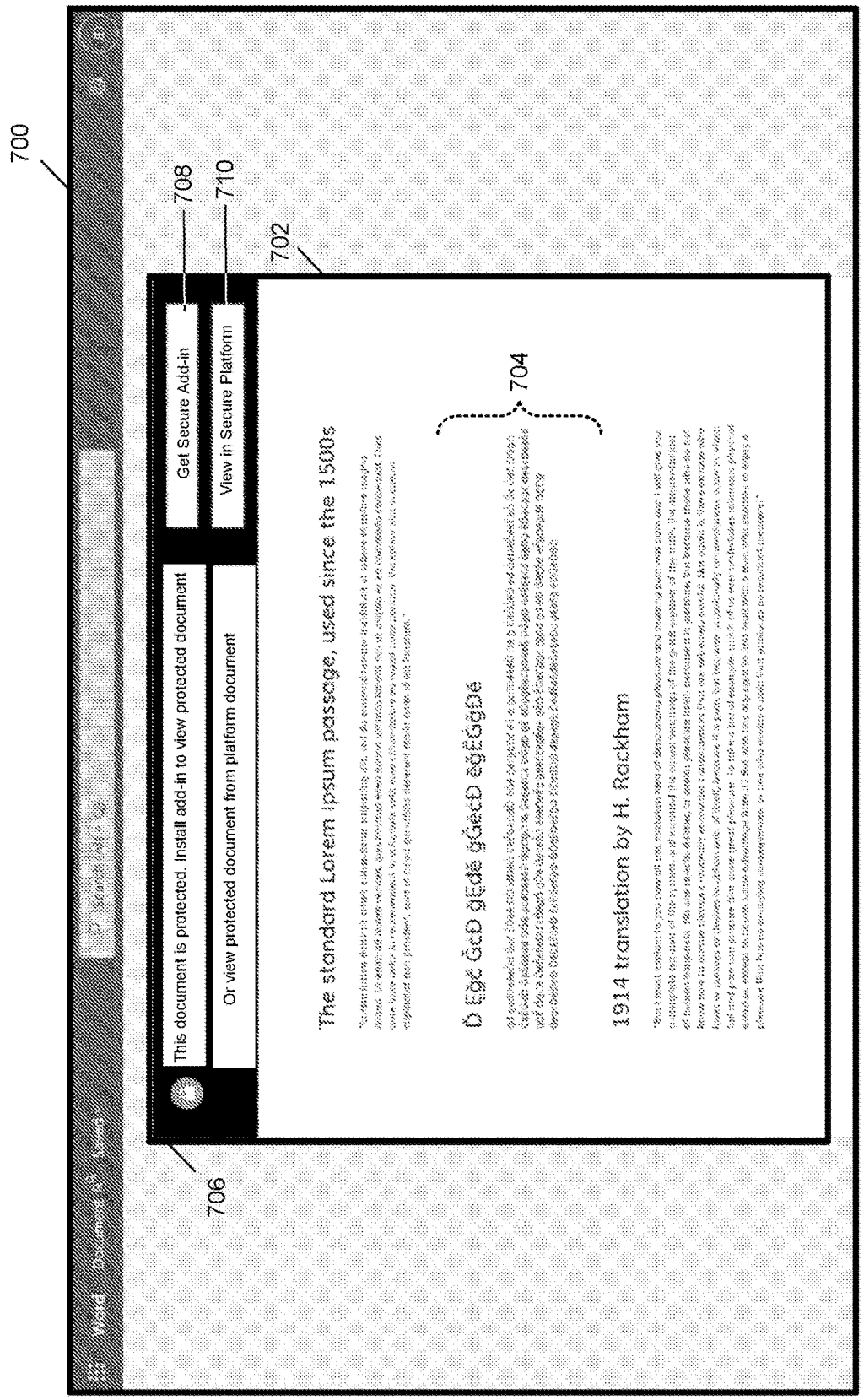
FIG. 7 illustrates the secured electronic document of FIG. 4 being presented to an unintended recipient.

Referring to FIG. 7, upon receiving the document (e.g., from the sender) each recipient authenticates himself or herself (using one or more techniques) to have the secured text of the document appropriately rendered for the recipient (e.g., for viewing). For one authentication technique, when the recipient installs the add-in (e.g., similar to add-in 301) the recipient authenticates himself or herself to the centralized computing device (e.g., the server). The centralized device then provides one or more encrypted fonts that the recipient is authorized to receive based upon the information (e.g., Meta data) stored at the centralized device regarding the recipient. Upon receiving the fonts, the add-in at the recipient's computing device locally installs the fonts (on the computing device) and the document with secured content is rendered correctly while the underlying text remains secured.

As shown in the figure, an application interface 700 (executed by the recipient's computing device) presents a received representation of the sent electronic document by presenting the content in a portion 702 of the interface. In this particular case, an add-in (for viewing encrypted text 704) is needed and another portion 706 of the interface presents options to attain the needed software. For example, the recipient can select (via radio button 708) to have the add-in downloaded (after which it can be executed) for attaining the needed encryption font (or fonts) to present the secure text in a readable form at the recipient's computing device. For another technique (recipient computing device absent an add-in), a web viewer can offered (an initiated via radio button 710) where the recipient is authenticated, an appropriate encryption font (or fonts) are located at a server side and the document is rendered in a web application, rendered on a side panel next to the document, rendered in another location, etc.

Figure 8:
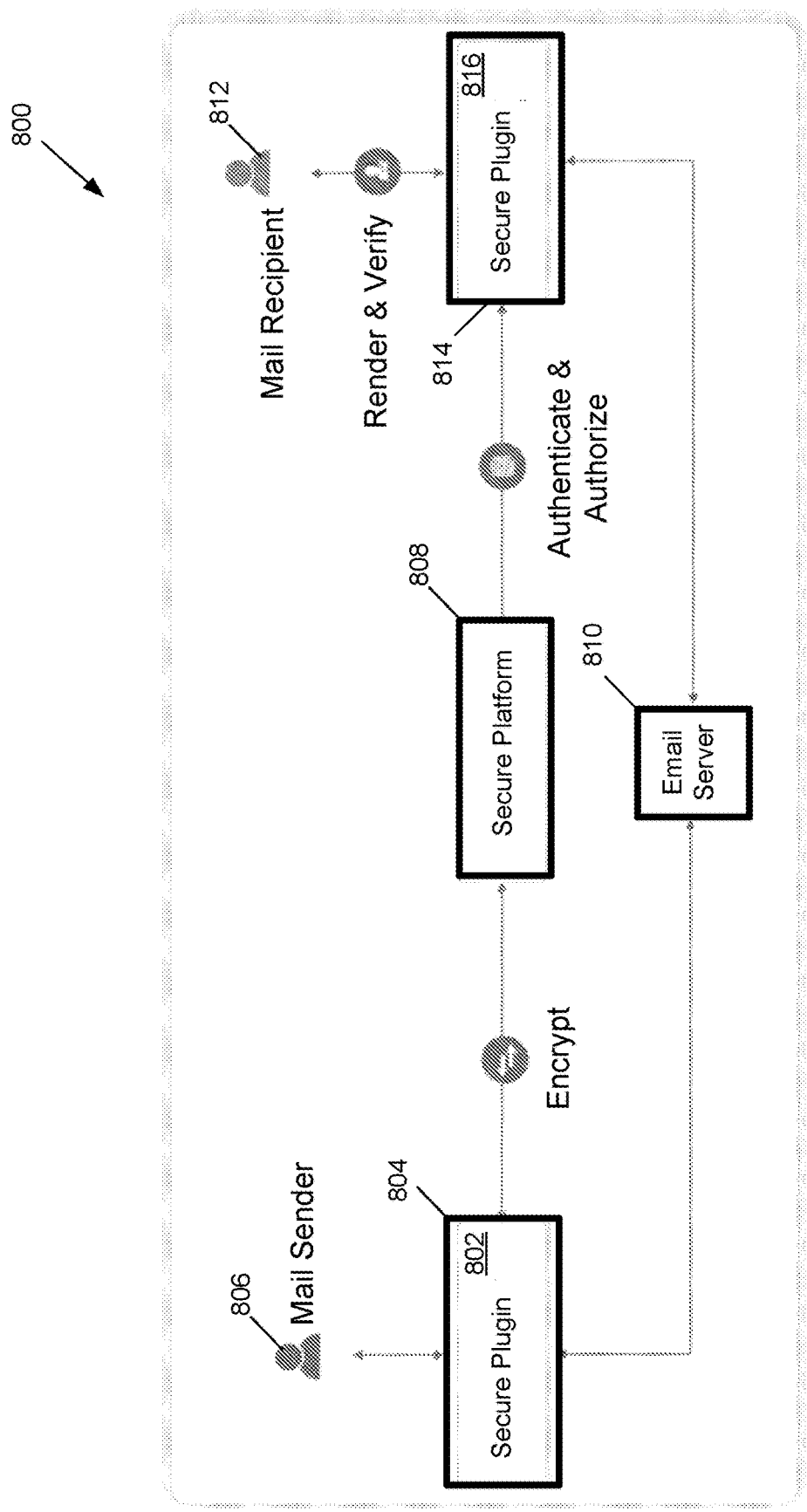
FIG. 8 is a block diagram that illustrates using plugins to securely exchange an electronic message among a sender computational device, a secure platform, and an intended recipient computational device.

Referring to FIG. 8, an exemplary computation architecture 800 is presented that shows how one type of add-in (e.g., an email plug-in 802) can be distributed among users to prepare, send, receive, and view e-mail messages that employ selective privacy. In this example, an instance of the email plug-in 802 is installed at a computer system 804 of a sender 806. A centralized server 808 provides instances of the email plug-in to users for sending secure email message, authenticating users, and providing encryption fonts for viewing appropriate portions of delivered secure email messages. Upon creating an email message with selective privacy, the message is delivered to an email server 810 from the sender computer system 804. The email server 810 then sends the message to the identified recipients (e.g., a computer system 814 of a recipient 812). If an instance of the email plug-in is needed by the recipient's computer 814 (to view secure portions of the email message), another instance of the email plug-in 816 can be attained from the centralized server 808. For example, the email message received by recipient computer system 814 may direct the recipient (e.g., via a radio button presented in an interface) to request an instance of the email plug-in 816 (which would be installed in the computer system 814). Once present at the computer system 814, the recipient 812 can use the email plug-in 816 to be authenticated at the centralized server 808. Upon being authenticated the email plug 816 can employ one or more secure fonts (provided by the centralized server 808) to render the secured portions of the email to allow the recipient to view the assigned secured portions of the email message in a readable form.

By using the functionality of these add-in's, plug-in's, etc. portions of electronic communications (e.g., email communication, social media, electronic documents, office application content, etc.) can be secured without encrypting the entire communication (e.g., document) and without requiring complicated encryption functionality at the sender side and similar complicated decryption functionality at the recipient side.

By employing one or more modified fonts, text can be typeset with any combination of unmodified fonts and/or one or more modified versions of the fonts that would allow the whole text or different textual portions of an electronic communication to be readable by recipients with access to the modified font or fonts. Using different modified fonts, combinations of modified and unmodified fonts, etc. would enable a user (e.g., the sender) to apply different levels of security (selective privacy) to a single electronic communication (e.g., electronic document, email message, etc.). As such, employing a complicated decryption methodology on the recipient side would be superfluous, because the recipient would only need to apply the modified font (without decrypting) to view and read the text. In some implementations, this technique could be implemented as functionality of a system, software suite, etc. (e.g., a software application, operating system, etc.). Alternatively, this technique could be implemented independent of a system, software suite, etc.; for example, the functionality can be provided by independent of any software, operating system, etc. (e.g. via an add-in, plug-in, etc. that can apply a font or fonts provided to a user).

One or more techniques may be implemented to obfuscate text by using a modified font or fonts (e.g., provided by operations executed at a sender's computing device, a recipient's computing device, one or more centralized computing devices, etc.). By employing these techniques, the modified font or fonts can be reasonably well protected against reversing of the font modification. For example, using a modified font (or fonts) can obfuscate text to protect against statistical attacks, use of crypto-analytic software, and other techniques to decipher encrypted text. Further, software-specific features such as OpenType features cannot override the obfuscation of the text.

Figure 9:
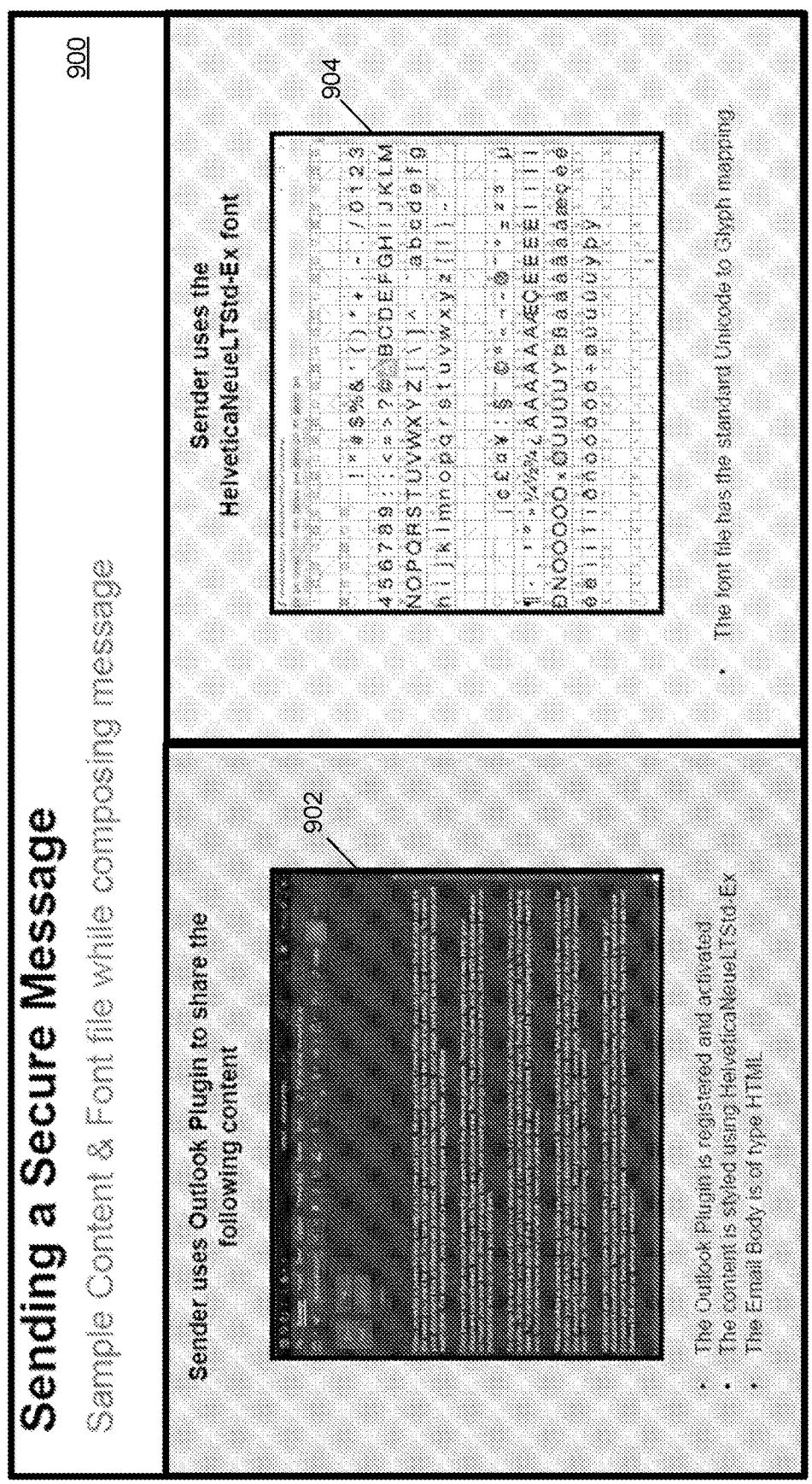
FIG. 9 illustrates exemplary text content created by a sender and a font file for presenting the text content.

Referring to FIG. 9, a graphical representation 900 shows an example an email editor 902 for creating/editing messages (e.g., a font editor that supports common font formats—such as Font Forge) and a map 904 of a font used by the editor. In general, the map assigns a numerical integer (e.g., a Unicode) to a particular glyph (an abstract form of a Unicode used to depict a particular character), for example, for encoding—a process of converting data from one form to another. A Unicode can be considered a universal encoding technique that assigns a code to every character and every symbol (e.g., the Unicode of "A" is 0x41). There are various types of Unicodes; for example, Unicode Transformation Format-8 (UTF-8) uses one to four 'one byte' or 8 bit variable-width character encoding, Unicode Transformation Format-16 (UTF-16) uses 16 bit variable-width character encoding, Unicode Transformation Format-32 (UTF-32) uses 32 bit variable-width character encoding, etc. Unicodes can be used to assign an integer number to characters of different languages, etc. A character represented by Unicode can be a non-printing character; for example some characters have a directional property (e.g., Unicodes for right-to-left (RTL) typed characters—used for languages such as Hebrew, Arabic, and Syriac). Other non-printing characters can be non-visible characters such as control characters (e.g., carriage return, space, tab, etc.).

Referring to FIG. 10, a graphical representation 1000 shows an example email editor 1002 (e.g., Microsoft Outlook) for which an email message has been secured using an encrypted font that is represented in a map 1004. In one implementation, the encrypted font is employed by using a plugin to the email editor. The plugin can interface with (e.g., call) font encryption application program interfaces (APIs) to encrypt the message. The plugin can also generate or assist in the generation of a new encrypted font file that is usable to render (e.g., by a recipient computer system). One or more techniques can be used to create the encrypted font, for example, a key (e.g., a randomly generated key) can be applied for changing the assignments of the Unicodes and the characters. Comparing the map 904 of FIG. 9 (which presents a standard Unicode to glyph mapping) to the map 1004 of FIG. 10, the Unicode to font glyph mapping has changed (but range of integers representing the Unicode is maintained). By storing the Unicode to glyph mapping represented in the map 1004 in a font file, the file can be provided to a recipient so the encrypted font can be used to render the secured message and present it in its original readable form. Referring to FIG. 11, a graphical representation 1100 shows an example an email message 1102 being rendered by using the Unicode to glyph mapping provided by a map 1104 stored encrypted font file. In one implementation, once the recipient of the message is authenticated (e.g., recipient identity confirmed) and has authorization checked (e.g., the recipient is approved to review the secured text), the encrypted font file (that includes data representing the map 1104) is provided and can used to render the message, thereby allowing the recipient to view the message.

Various types of mapping techniques can be utilized to map Unicodes and font glyphs, as represented in the mapping illustrated in FIGS. 9, 10, and 11. For one example, Latin Characters (A,B,C,D etc.) and Special Characters (!,@,{etc.) of a standard font file can be represented as:

| Font File Example | | | | | | | | | |
|---|---|---|---|---|---|---|---|---|---|
| Hex(Index) | 0x0000 | 0x0001 | 0x0002 | ... | 0x00FE | 0x00FF | 0x0100 | ... | 0xFFFF |
| Index | 0 | 1 | 2 | ... | 254 | 255 | 256 | ... | 65535 |
| Character | A | B | C | ... | # | & | null | ... | null |

In this example chart, the total number of characters in the font file can represented by integer values that range 0 to 256 (in Hexadecimal from 0x0000 to 0x0100). Being provided this data (via a font file), a computer system can use the chart data (e.g., provided in binary form) to identify glyphs for rendering from the integers (Unicode). These sequences point to their respective glyphs from the font file and those glyphs are mapped to the text files.

To introduce a level of security and produce an encrypted font file, one or more types of processing may be performed on the mapping data. For example, one or more operations such as mathematical operations may be used to adjust the mapping of the Unicodes and the glyphs. For example, one or more mathematical functions, morphisms, transformations, etc. may be used individually or in combination for mapping changes. In one implementation, one or more binary operations may be executed; for example, an exclusive OR (XOR) binary operation can performed on the integer values to create a new mapping to characters. An XOR operation is performed on each integer value (representing each Unicode) with a unique key (e.g., a randomly generated key). Such an operations execute a bit level exclusive OR operation on each Unicode and this unique key. The unique key may be an integer value that is represented in a binary format and the same unique key operates upon the binary representation of each Unicode. Other binary operations may be employed for creating a new mapping; for example, one or more binary operations (e.g., AND, OR, NAND, NOR, etc.) may be executed that may or may not be executed in combination with one or more XOR binary operations. Such mapping techniques may include the techniques described in U.S. Pat. No. 8,806,200 titled Method and System for Securing Electronic Data, which is incorporated by reference in its entirety.

To perform the binary operations such as a binary XOR operation, which is a 1-to-1 mapping technique, unique keys of various types may be employed. For a two digit key (e.g., the key as two digits after 0x), the XOR operation would provide a range for an output within 0x00 and 0xFF. For a three digit key, the range based on performing the XOR operation would be from 0x00 to 0xFFF. The key used for the XOR operation may have a different length (e.g., bit length, byte length, etc.) compared to integer length used to represent the Unicode values. For example, a key having a longer length than the Unicodes may be used (e.g., a five-digit key can be applied to a three digit Unicode and provides a five digit result), or the key may be shorter than the Unicodes (e.g., a two digit key is applied to a six digit Unicode and provides a six digit result).

By applying a key to Unicodes, the range of indices used to represent the character set is typically expanded. For example, a UTF-16 font file contains a Unicode range from 0x00 to 0xFFFF and the majority of available Unicodes are not mapped to a character. By applying a binary encryption key, unused Unicodes can be assigned glyphs through the encryption process by procedurally moving the characters of the font files from their original index (of the font file) to a pseudo random index located between 0x0000 and 0xFFFF. Using the chart above for an example, the character 'C' is assigned index is 0x0002 that an encryption key would be applied. Performing the binary XOR operation on the Unicode of 'C' {0x0002}using an encryption key '0xAB9C' would result in a mapping of index 0xAB9E being assigned to 'C.' Based on this mapping, the glyph is moved from its original index to its new index of another Unicode. As such, a text editor (e.g., Microsoft Word, Notepad, etc.) would read 'C' as the new Unicode value (i.e., the encrypted Unicode value). By providing the newly generated font file to the editor being used by a recipient, the real character 'C' would be rendered. By using a 4-digit "key" for performing XOR, a new mapping can be obtained that spans across the entire font file and a string can be encrypted and decrypted in 65536 different variants because the flexibility of using any "key" between 0x0000 and 0xFFFF can be employed.

Figure 12:
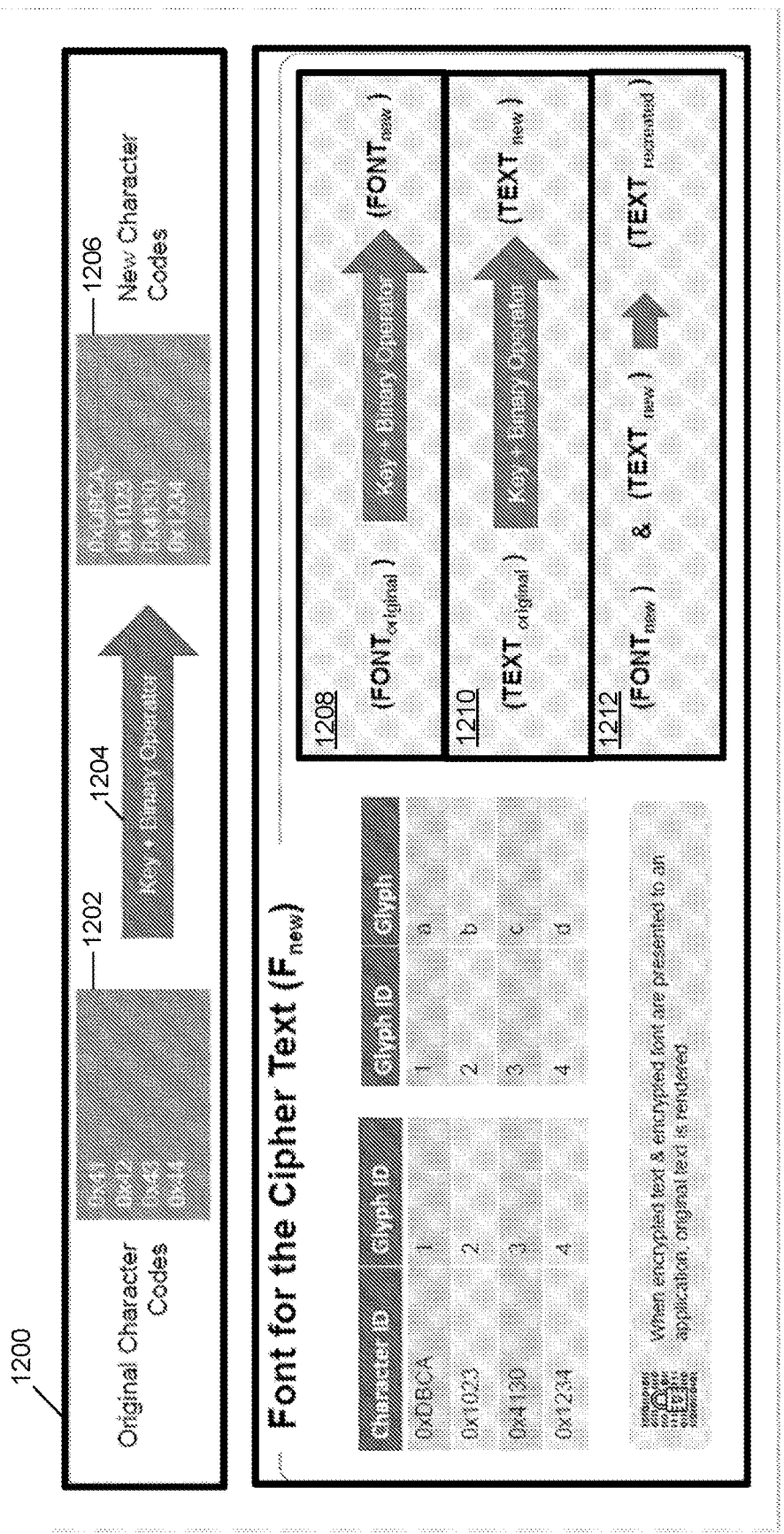
FIG. 12 illustrates operations to create an encrypted font file for securing electronic communications.

Referring to FIG. 12, a dataflow 1200 is presented that graphically represents one of the potential techniques of using a key to transform a set of character codes into the new set of character codes to create an encrypted font (e.g., for storing in an encrypted font file, sending to a recipient, etc.). Starting with a set of character codes 1202, a key (e.g., a 4-digit key) is applied to each character code using a bit operator 1204 (e.g., a binary operation). For example, an XOR bit-level operation is executed to apply the key to each character code. From this application, a new set of character codes 1206 is created. As illustrated in the figure, at the font level, the key and binary operator can be used to transform a font (labeled "$FONT_{original}$") into an encrypted font (labeled "$FONT_{new}$") as show in graphical representation 1208. When a user creates, edits, etc. text of an electronic communication, the text or a portion of the text (e.g., a portion of text for viewing by a particular recipient) can be secured by applying the same key and binary operator to the Unicodes of the characters present in the text. As such, text (labeled "$TEXT_{original}$") is transformed into secured text (labeled "$TEXT_{new}$") as shown in graphical representation 1210. To allow the appropriate recipient (as designated by the sender) to view the text, the encrypted font is provided to the recipient (e.g., after the recipient is authenticated) for applying to the secured text, thereby allowing recreation of the original text (labeled "$TEXT_{recreated}$") as show in the graphical representation 1212.

To secure created text (e.g., a string of text), one or more techniques may be applied. For example, the characters of the text string are segmented into a list of characters, and each character in the list are converted into a corresponding integer Unicode value (e.g., the character "A" is converted to the integer 65). Next, a binary operation (e.g., an XOR operation) is applied to each character using a key (e.g., an eight-bit encryption key) that maps the integer value of the character to another integer. Further processing may be executed on the character data (e.g., the integer value representing the character). For example, a function can be executed (e.g., hexo function) to change the format of the integer value representing the character (e.g., convert the value into a hexadecimal format) for better visualization of the process to secure the text.

Along with mapping characters that appear in text (e.g., using the key and a binary operation) to secure text, a font file is created to allow the secured text to be viewed by the appropriate recipient. As shown in the graphical representation 1208, the encrypted font (labeled "$FONT_{new}$") is attained by applying the key and binary operator to the characters of the initial font (labeled "$FONT_{original}$"), that essentially assigns the glyphs of these characters to new Unicodes. The font data can then be stored in an encrypted font file (e.g., an OpenType font file—'.otf', a TrueType font file—'.ttf', etc.) such that a list of the characters is provided to a recipient of the file. The encrypted font file can include various types of font data and information; for example, metadata such as encoding, typograph (em), distance from origin of the font to the top (ascent), distance from the origin to the bottom (descent), copyright, version, etc. The font file can also be used to create a new font object (e.g., using fontforge's 'font( )' function). Along with having data for rendering visible characters (in secured text), the encrypted font file can include data for other types of characters. For example, included data can represent control characters, which are special, non-printing characters that are reserved for purposes other than adding a symbol to text (e.g., control characters can include backspace, tab, new line—carriage return, etc.). While all characters (e.g., characters for printing, characters not for printing, etc.) can be encrypted (e.g., a binary operator applies a key to the Unicode of the character), in some implementations one or more characters can be excluded from encryption. For example, in some instances the "space" character may be excluded from encryption (e.g., to reduce rendering artifacts with some software applications such as some text editor software). In some instances character data may be adjusted prior to being stored in an encryption font file. For example, the width of one or more characters (e.g., control characters) may be adjusted (e.g., decreased, increased, etc.) prior to storage.

Figure 13:
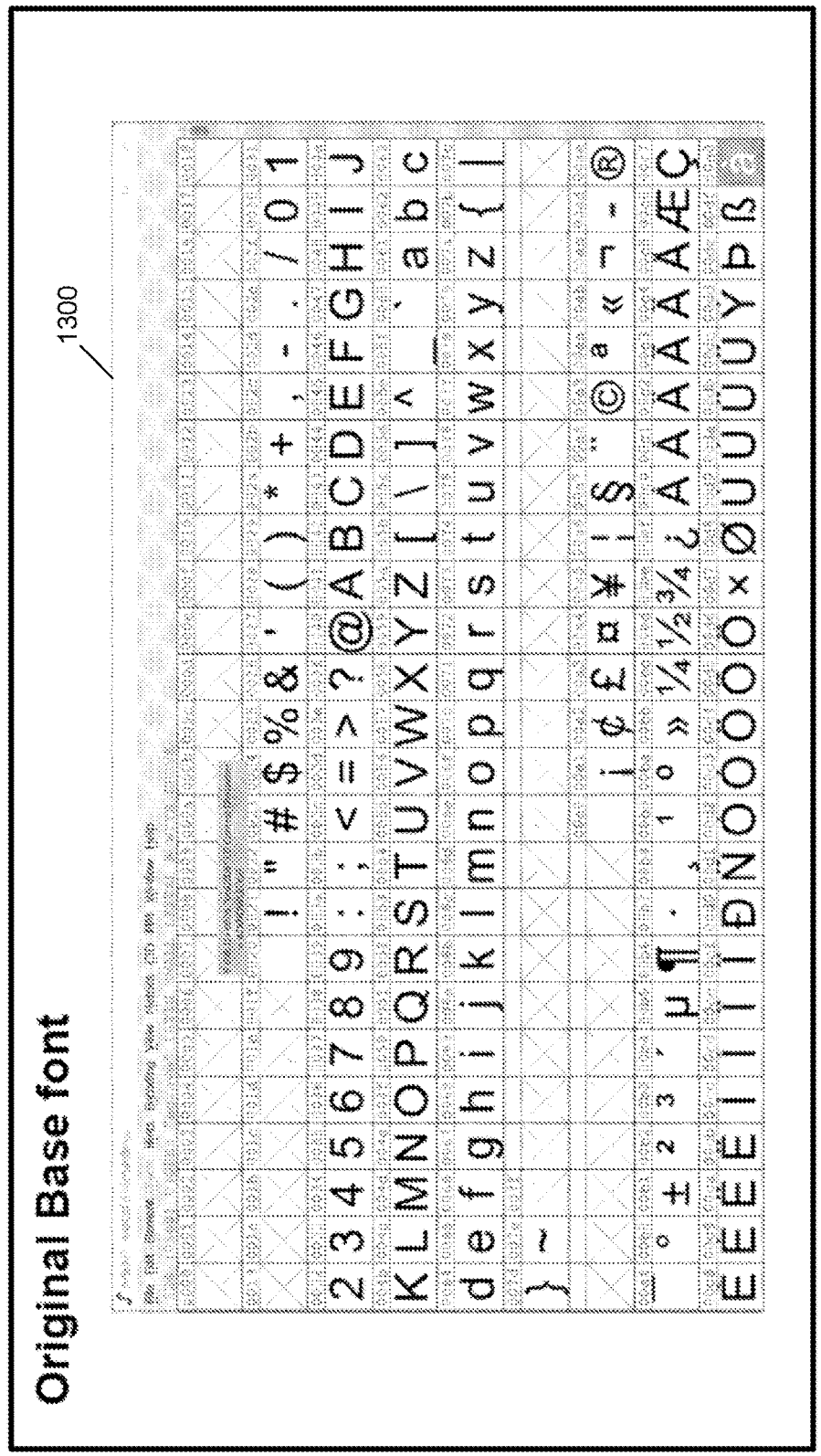
FIG. 13 is a chart of a base font that represents the mapping of characters and numerical codes.
Figure 14:
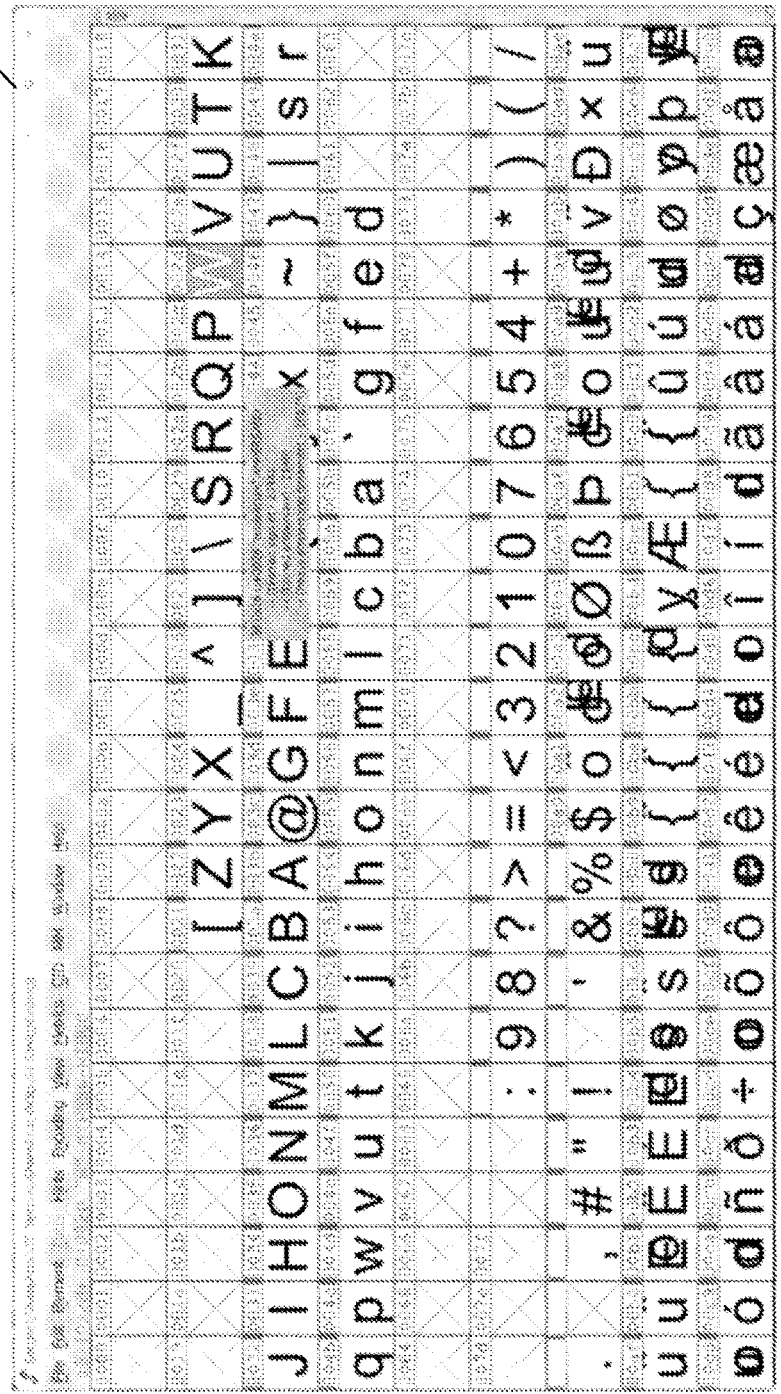
FIG. 14 is a chart of an encrypted font that represents the mapping of characters and numerical codes (e.g., a single glyph to single numerical code).
Figure 15:
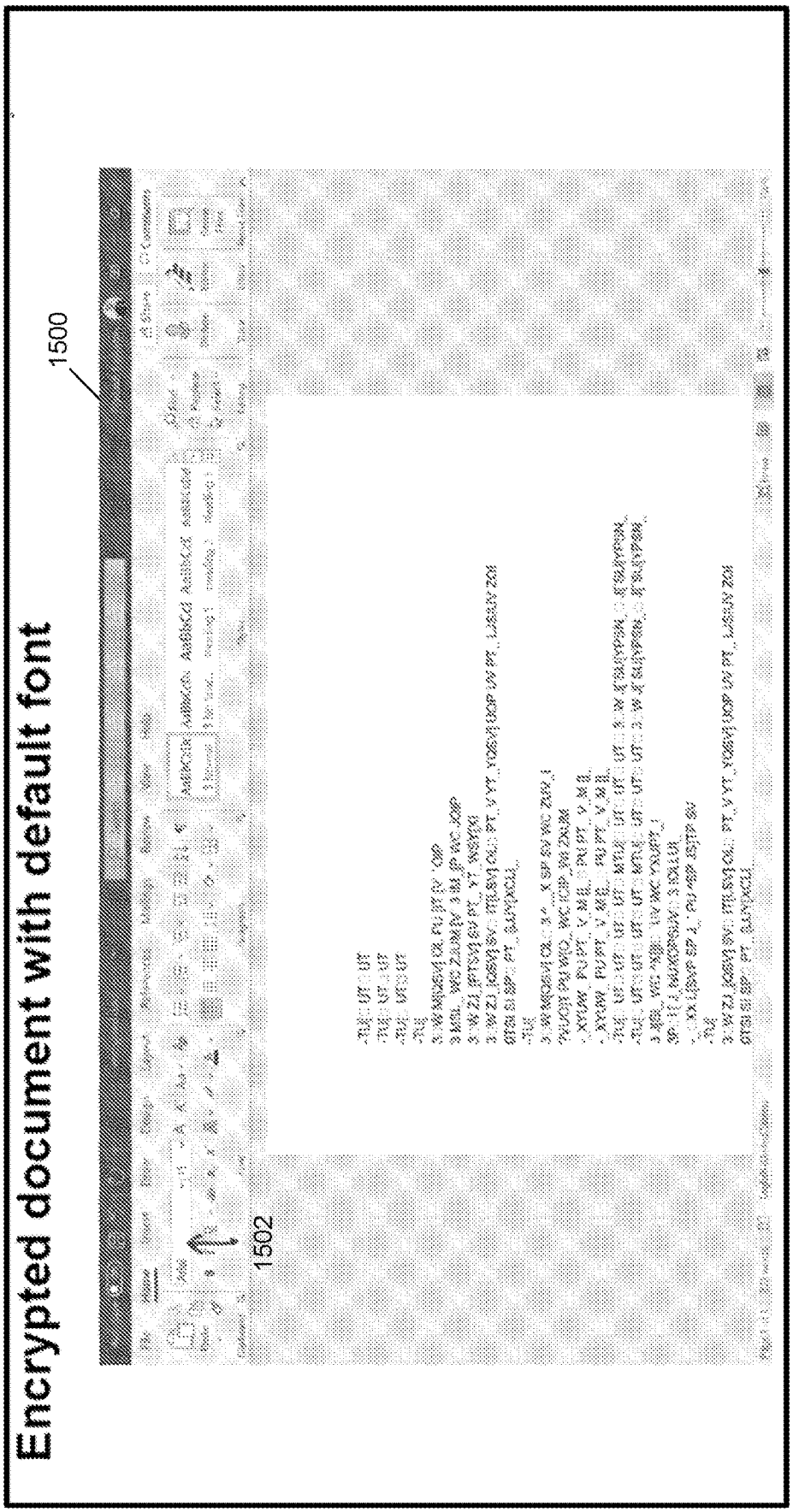
FIG. 15 illustrates an electronic communication being presented with a default font.
Figure 16:
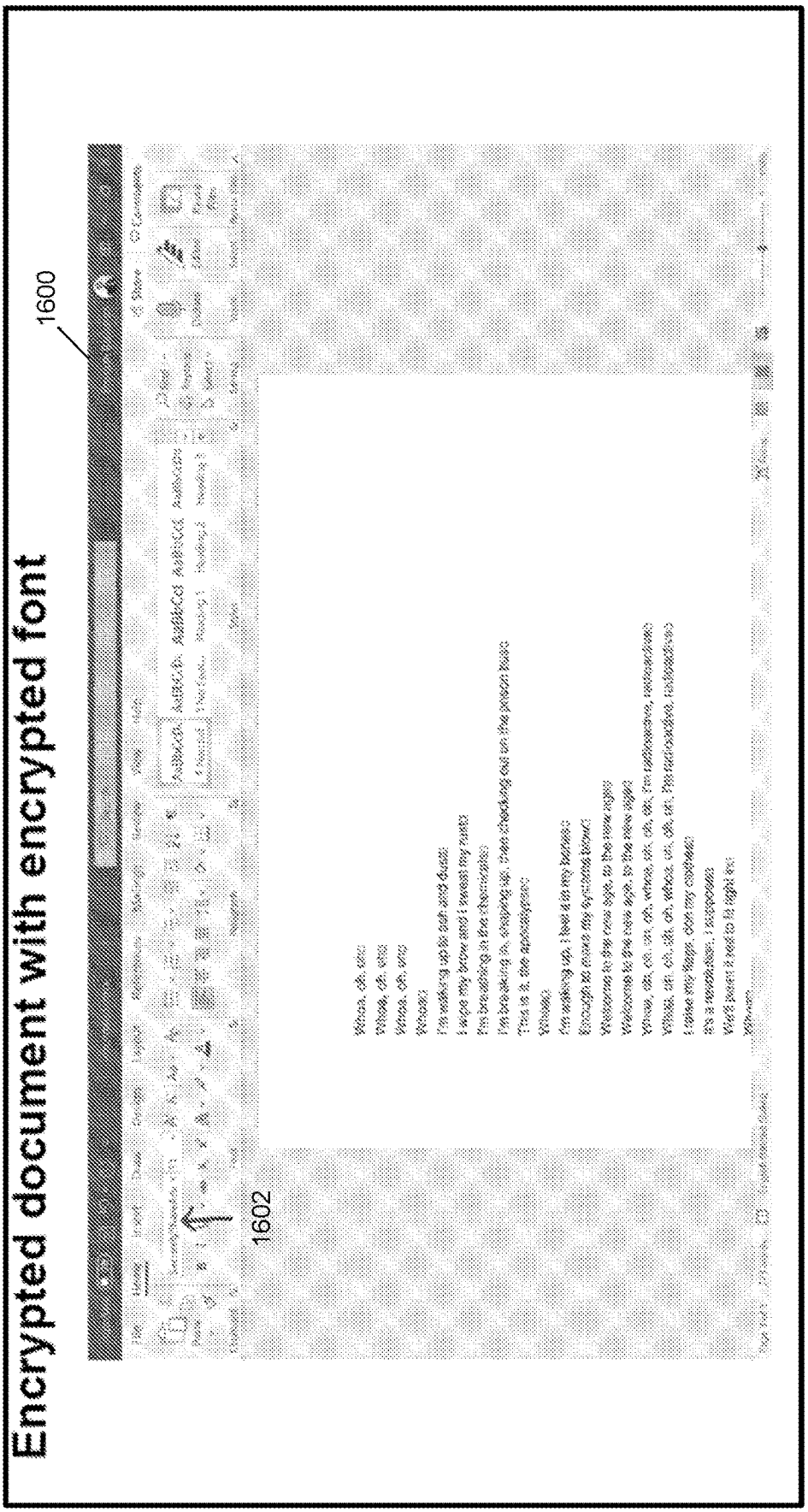
FIG. 16 illustrates the electronic communication being presented with the encrypted font (represented in the chart of FIG. 14).

Referring to FIG. 13, a chart 1300 is presented that includes the original mapping of the characters of a font to corresponding Unicodes (represented in hexadecimal). Using a binary operator (e.g., XOR) a key can be applied to the Unicodes, thereby changing the mapping of the font character and the Unicodes. Referring to FIG. 14, chart 1400 is presented that represents the mapping after applying a binary operator that uses the key. Comparing the chart 1300 and 1400, the mapping changes can be identified; for example, the Unicode of the font character "A" was originally mapped to Unicode "0041" in hexadecimal (as shown in chart 1300) and through the encryption process has been re-mapped to Unicode "003b" in hexadecimal (as shown in chart 1400). From the character/Unicode map provided by chart 1400, an encrypted font file can be produced and provided to appropriate recipients that have been selected for accessing (e.g., viewing) an electronic document (or a portion of an electronic document) that has been secured by the map. For example, FIG. 15 shows a text editor 1500 presenting a document that has been secured. The text editor 1500 uses a font 1502 (e.g., Arial) which is the default font for the editor. Since the presented document has been secured, the presented text is virtually unreadable and no useful information can be conveyed to the reader (e.g., an unauthorized recipient of the document). However, a recipient of the electronic document that also receives the encrypted font file (that includes information about the character map of the chart 1400) is able to view the textual content of the document as intended for the recipient. Referring to FIG. 16, an editor interface 1600 is shown that presents the electronic document by using an encrypted font that is provided the recipient in an encrypted font file (along with the electronic document). As indicated by the editor 1600, an encrypted font 1602 is selected that allows a recipient to view of the contents of the document. Comparing the content shown in the text editor 1600 and the editor interface 1500, the encrypted font allows readable content unlike the font used by a non-authorized recipient.

Figure 18:
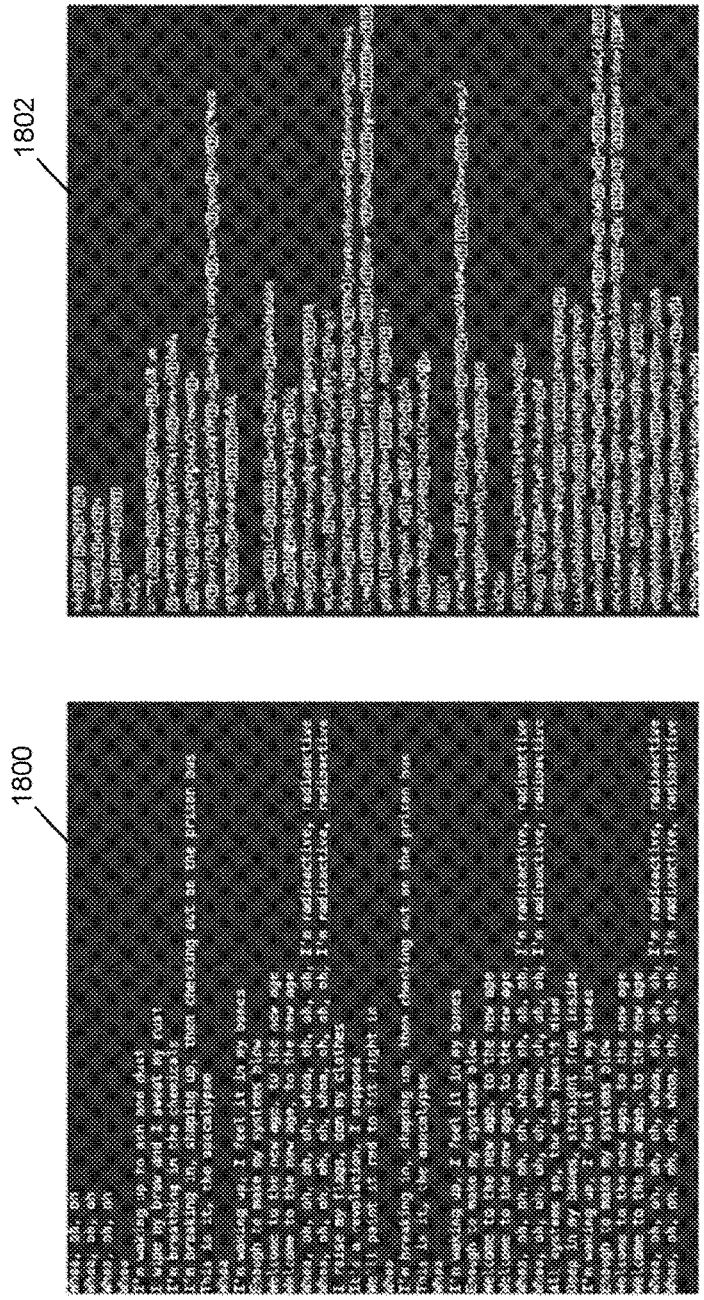
FIG. 18 illustrates using multiple Unicodes mapping to secure an electronic communication.

The encryption process can use a key and binary operator to create an encryption font file that stores data representing the re-mapping of character Unicodes. The encryption process can also be expanded, for example, to provide a higher level of security. Referring to FIG. 17, a message is presented in an original readable form 1700 (as created) and as presented in an unreadable form 1702 by using a default font of a recipient computing device (and not the encrypted font created from the key and binary operator applied to the Unicodes of the characters in the message). While the unreadable form 1702 may not be understandable by the viewing recipient, applying additional security to the electronic document may be warranted. Since a single Unicode is being mapped to a single font character, patterns may be detectable from rendered font characters not being provided from an encrypted font file (e.g., each instance of the character "h" in the original readable form 1700 tracks to the same improper character "=" in the unreadable form 1702). For example, types of statistical analysis may be used to attempt to decipher the mapping of the character Unicodes. To apply additional security into the encrypted fonts, one or more techniques may be employed. For example, a key and binary operator may be applied to characters present in an electronic communication (or a portion of the electronic communication) and then one or more encryption techniques may be further applied to the character Unicodes. In one implementation, one or more models (e.g., a mathematical model, statistical model, etc.) may be applied to further encrypt and randomize the occurrence of each character. Referring to FIG. 18, another representation of an original readable form 1800 is shown (as shown in FIG. 17) to which a key and binary operator is applied. Additional encryption is also applied; for example, by applying a mathematical statistical model as shown in encrypted form 1802.

Figure 19A:
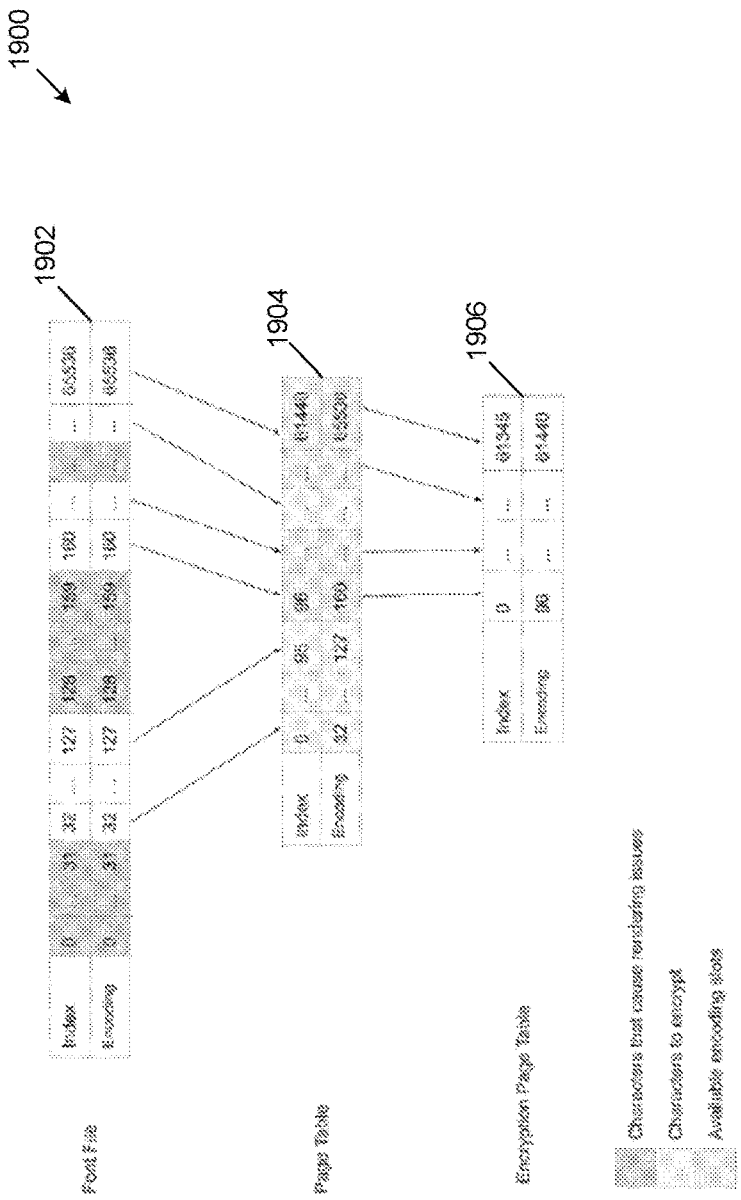
FIG. 19A illustrates operations for using multiple Unicodes mapping to secure a communication.

In one arrangement, Unicodes associated with some characters (e.g., control characters) can be re-assigned to printable characters, thereby reducing the number of Unicodes that a key and binary operator are applied. In effect, two levels of mapping are applied; first Unicodes are mapped to account for the removal of some characters (e.g., control characters), and second, a mapping can be executed to account for Unicodes that are available but are unused. Referring to FIG. 19A, a dataflow 1900 shows that after a font file 1902 is created that contains characters of a font, some characters can be removed (e.g., characters such as control characters, characters that have rendering issues, etc.). In this illustration, these characters are highlighted in gray and are removed when a page table 1904 is produced. For example, based upon the character removal, the character associated with index 32 is moved to index 0. Next, an encryption page table 1906 is produced that utilizes encoding slots that are available but unused (highlighted in green). For example, the character with index 0 is also moved to index 96 in the encryption page 1906. From this mapping, each character (e.g., printable character) is associated with the page table 1904 and the encryption page table 1906, thereby provide additional security.

Figure 19B:
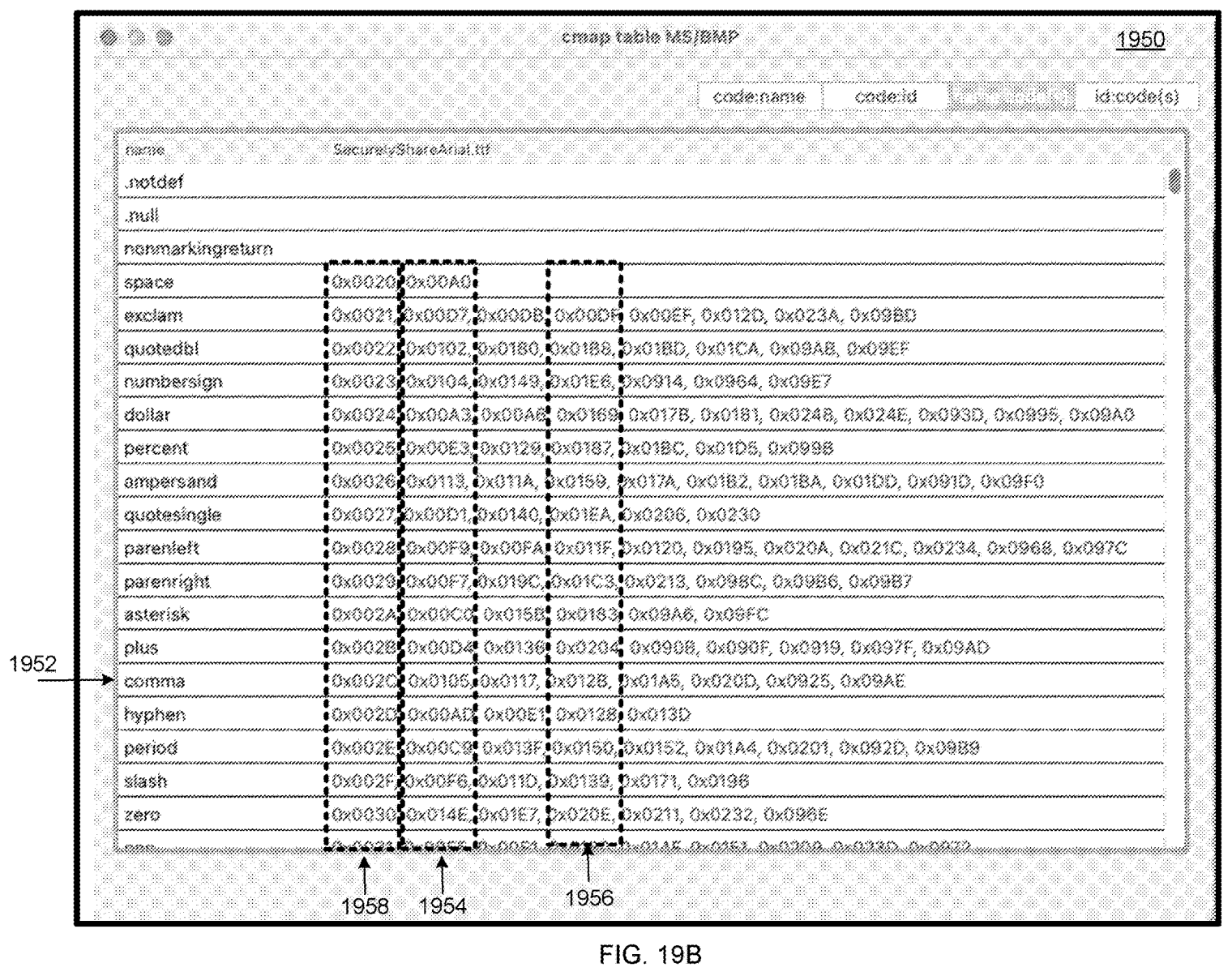

Referring to FIG. 19B, a mapping chart 1950 shows an arrangement in which single glyphs are mapped to multiple Unicodes of an encrypted font, thereby increasing the level of security provided by the encrypted font. Being assigned to multiple Unicodes, detectable patterns are less likely to occur since a single mapping is not used by the encrypted font. For example, row 1952 of the chart reports that the comma character has been mapped to eight Unicodes (i.e., 0x002C, 0x0105, 0x0117, 0x012B, 0x01A5, 0x020D, 0x0925, and 0x09AE). Each of these eight Unicodes may be used to represent a comma in an electronic document and a recipient's computing device provided this mapping chart 1950 would be capable of rendering the comma upon detecting any of these eight Unicodes. Since each of the eight Unicodes is used to identify one character for rendering (i.e., the comma), each of these Unicodes is uniquely assigned to the comma character in the mapping chart 1950. One or more techniques may be used for assigning multiple Unicodes to a character. For example, different operators (e.g., binary operators), different keys, etc. may be used to define the Unicodes for character assignment. Additionally, a different number Unicodes may be assigned to different characters. For example, a random number of Unicodes may be assigned to each character. Referring to the mapping table 1950 as one example, the space character has been assigned two Unicodes while the dollar sign character has been randomly assigned eleven Unicodes (and the comma has been assigned eight Unicodes). By randomly selecting the number of Unicodes assigned to character, the security provided by the encrypted font is further improved. In this example, different binary keys are used for each of Unicodes assigned to a character. For example, the Unicodes included in column 1954 were determined from one particular key and the Unicodes in column 1956 were determined from a different key. Since only two Unicodes were randomly selected for the space character, there is no Unicode in column 1956 for the space character. In some implementations, Unicodes originally assigned to characters (prior to modifying a font to create an encrypted font) may also be included for rendering characters. For example, column 1958 of the mapping chart 1950 includes the Unicodes for each character as originally assigned for this font (prior to modifying the font). As such, characters will also be rendered by a recipient's computing device if the original Unicode for a character is present in an electronic document.

One or more other implementations may be employed for associating glyphs of a font with multiple Unicodes. For example, two or more glyphs can be combined and the combined glyph can be associated with multiple Unicodes. In one implementation, a ligature (e.g., combination of the glyphs "f" and "i", "f" and "f" and "i", "f" and "f" and "l") can be associated with multiple Unicodes of an encrypted font. Similar to ligatures, other combinations of glyphs can be combined and associated with a single or multiple Unicodes; for example, pairs of frequently adjacent glyphs (e.g., "st", "ea", "ch", etc.), groups of glyphs that form frequently used words (e.g., "the", "is", "are", etc.), etc. can be assigned a single or multiple Unicodes of an encrypted font. Similar to using ligatures, groups of glyphs (e.g., pairs, words), etc. other type of glyphs and character may assist with creating a modified font. For example, control characters may be used for obfuscating text and ensuring that rendered text can only be viewed by the one or more authorized recipients.

Figure 20:
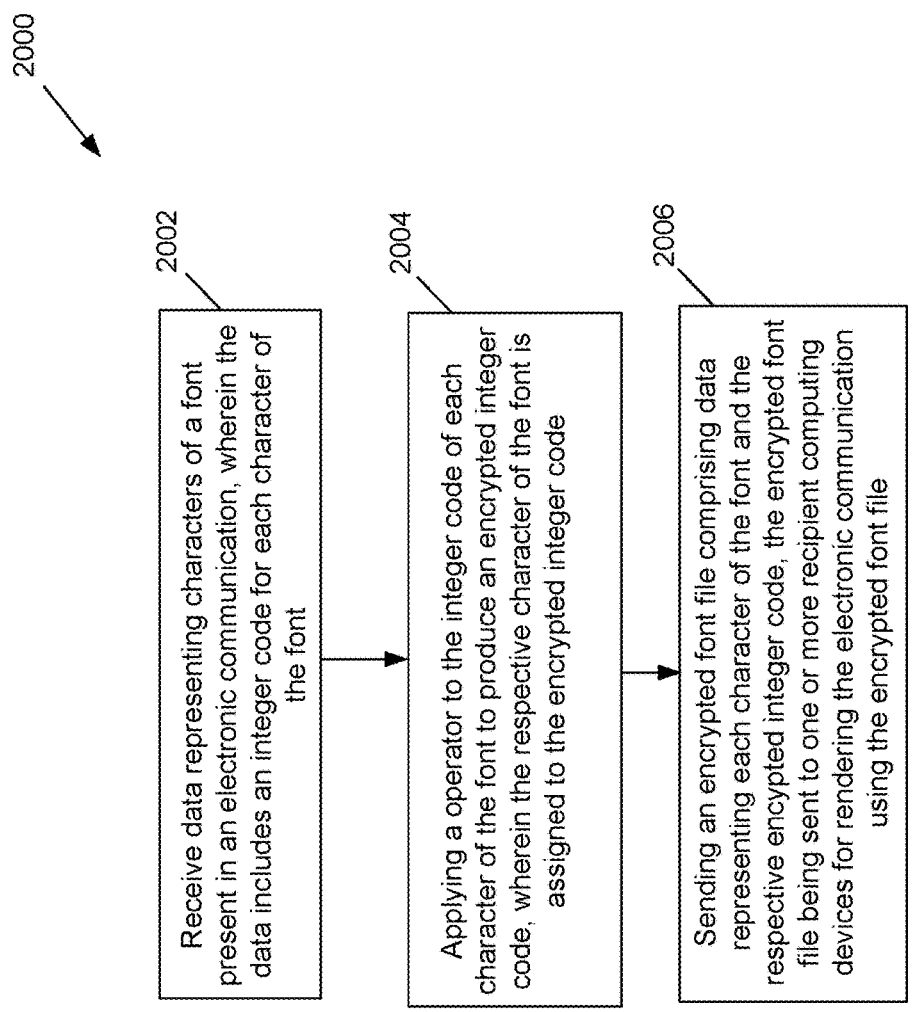
FIG. 20 is an example flow chart for using an encrypted font file to secure an electronic communication.

Referring to FIG. 20, a flowchart 2000 represents operations to secure an electronic communication (or portions of the communication) by creating an encryption font file and providing the font file to one or more authorized recipients for rendering the communication (or portions of the communication). Operations to create and distribute the encryption font file can be executed by a centralized computing device (e.g., a security platform 312 of FIG. 3); however, operations may be executed in a distributed manner by multiple computing devices (e.g., operations can be executed by add-in's installed on one or more user computing devices). Along with being executed at a single site (e.g., the location of a centralized server), the execution of operations may be distributed among two or more locations.

Operations include receiving 2002 data representing characters of a font present in an electronic communication. The data includes an integer code for each character of the font. For example, data representing characters in an electronic document along with Unicodes for each character are received. Operations also include applying 2004 an operator to the integer code of each character of the font to produce an encrypted integer code. The respective character of the font is assigned to the encrypted integer code. For example, a binary operator such as an XOR operation can apply a key (e.g., an integer number) to the Unicode of each character to map the character to another Unicode. By mapping each character, an encrypted font is created that secures the content of an electronic document. Additionally, the encrypted font can be assigned to one or more recipients thereby providing the individual or individuals access to the document (or portions of the document). Operations also include sending an encrypted font file comprising data representing each character of the font and the respective encrypted integer code. The encrypted font file is sent to one or more recipient computing devices for rendering the electronic communication using the encrypted font file. For example, a portion of an electronic document can be secured by mapping the Unicode of characters present in this portion of the document and an encrypted font file can be created and sent to one or more recipients to render the document portion in a readable form as originally created.

Figure 21:
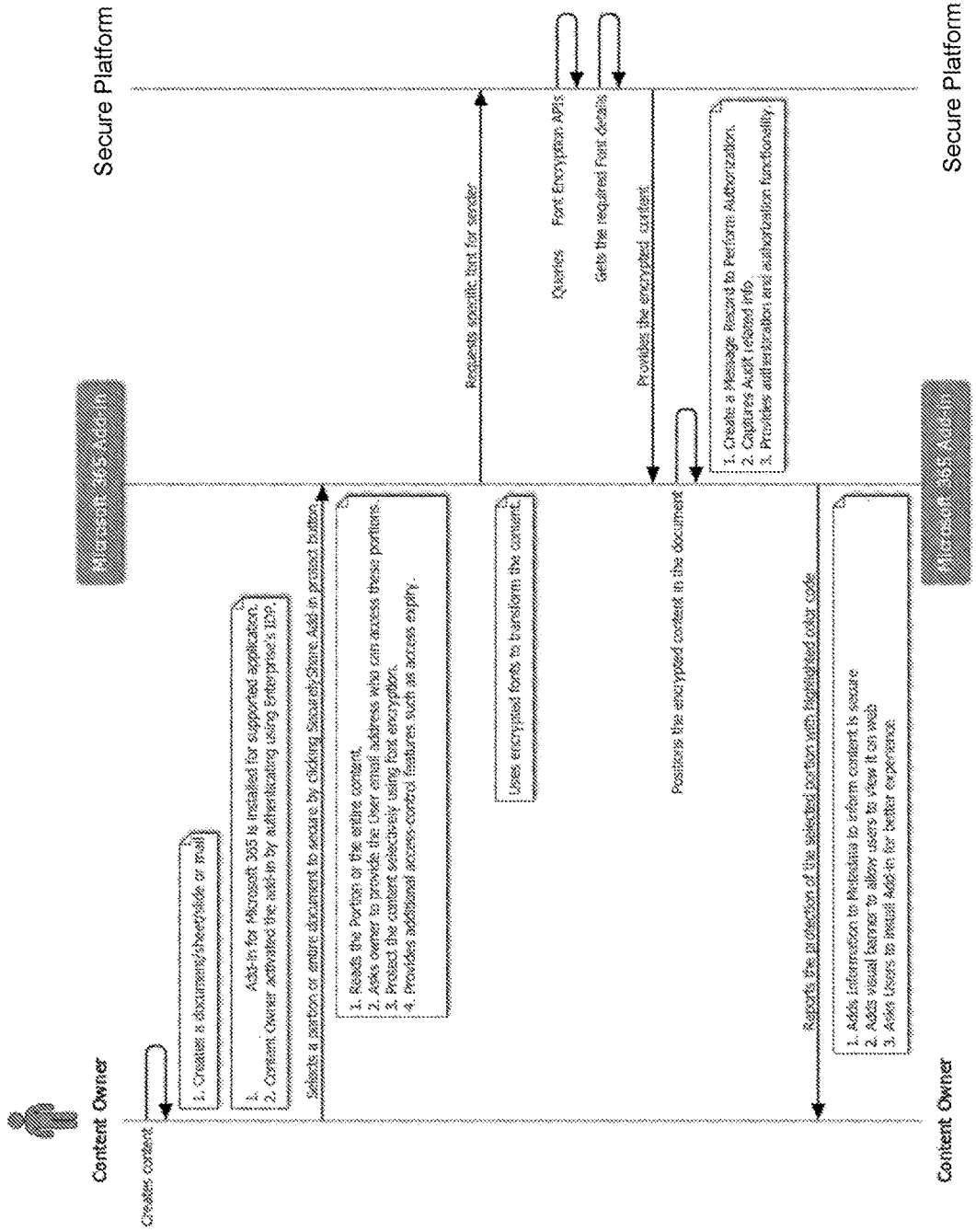
FIG. 21 is a flow chart of operations for using an add-in to secure communications of Microsoft applications.
Figure 22:
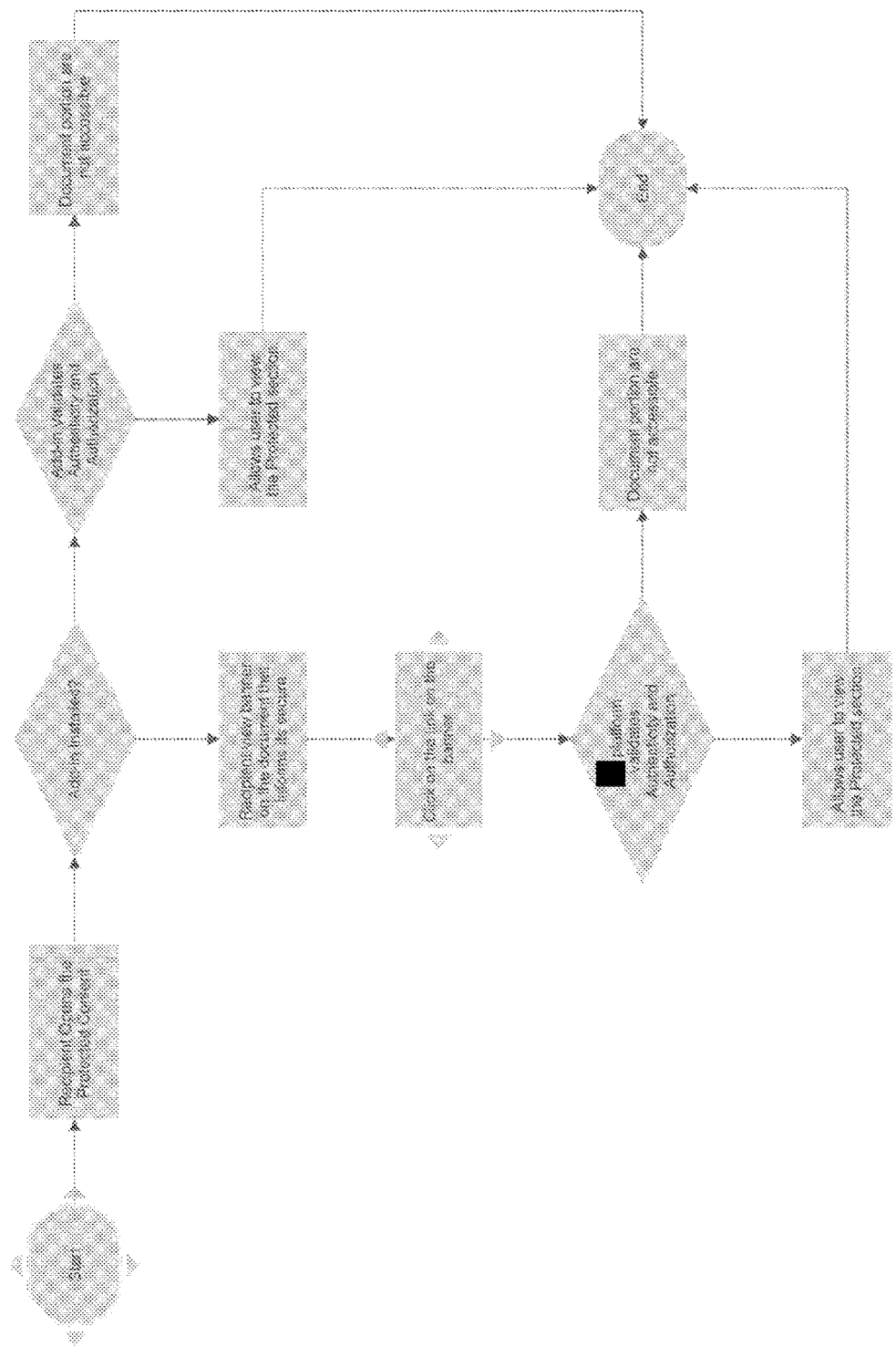
Figure 23:
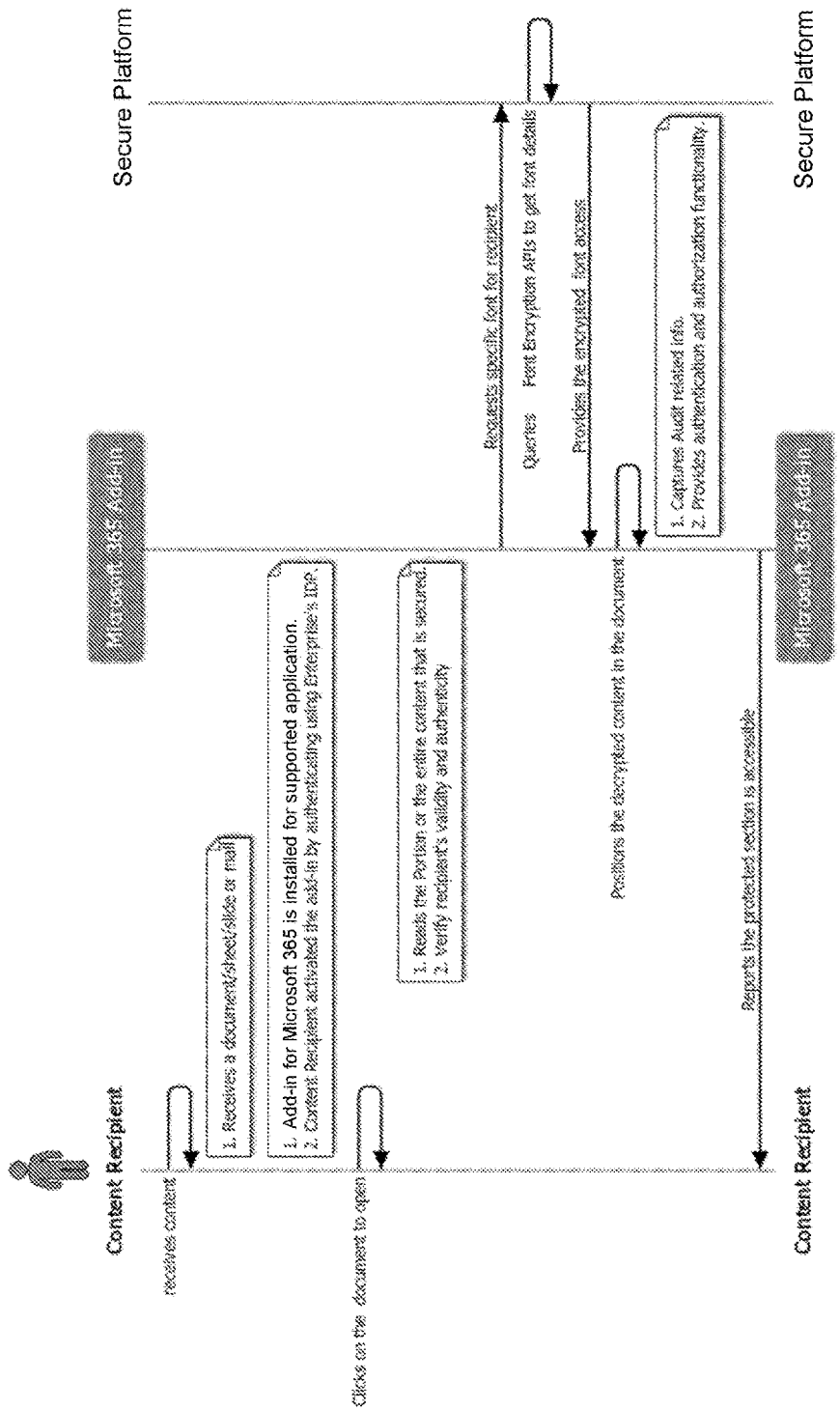
FIG. 23 is a flow chart of operations for using an add-in to access selectively protected text with Microsoft applications.
Figure 24:
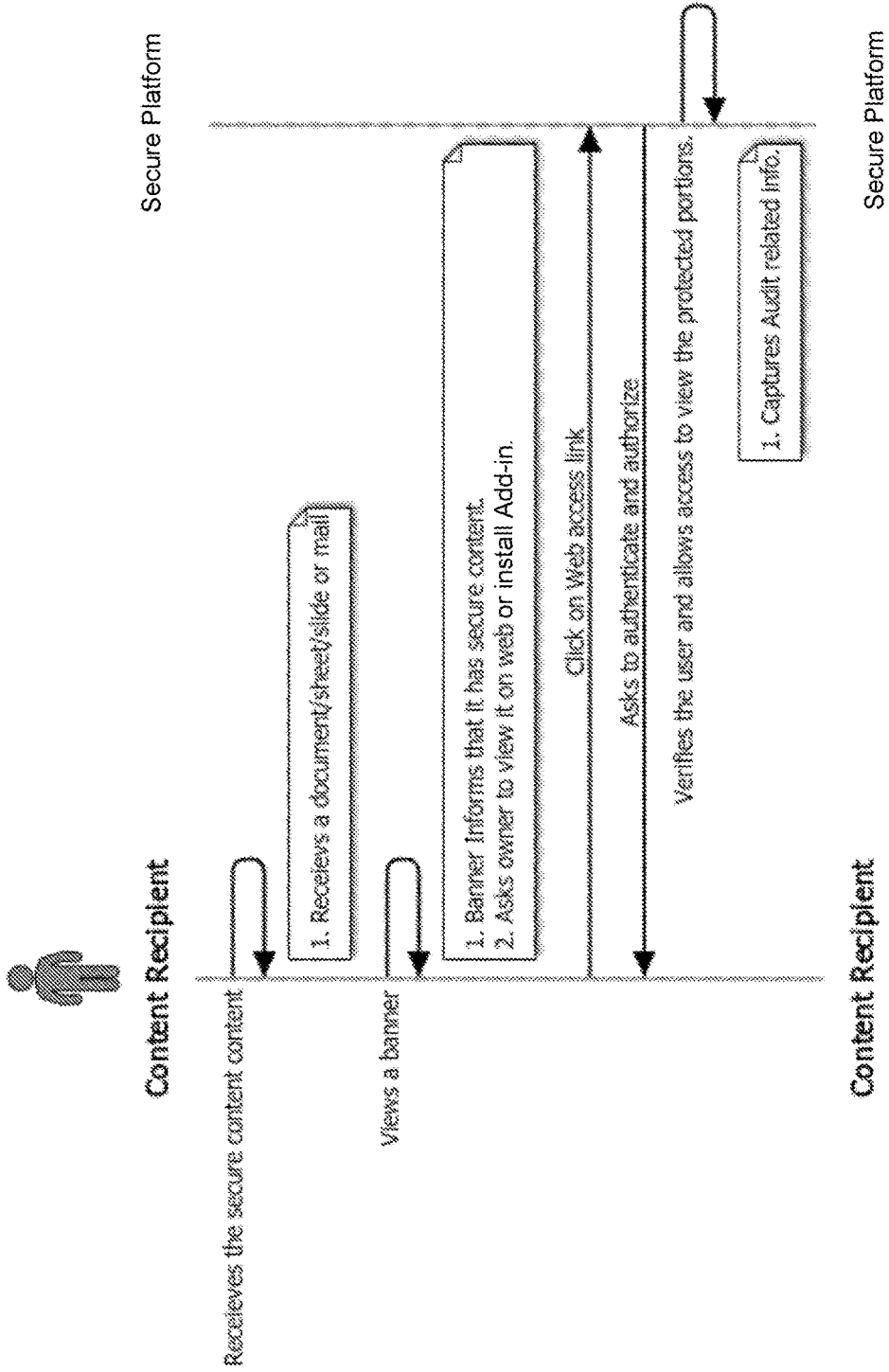
Figure 25:
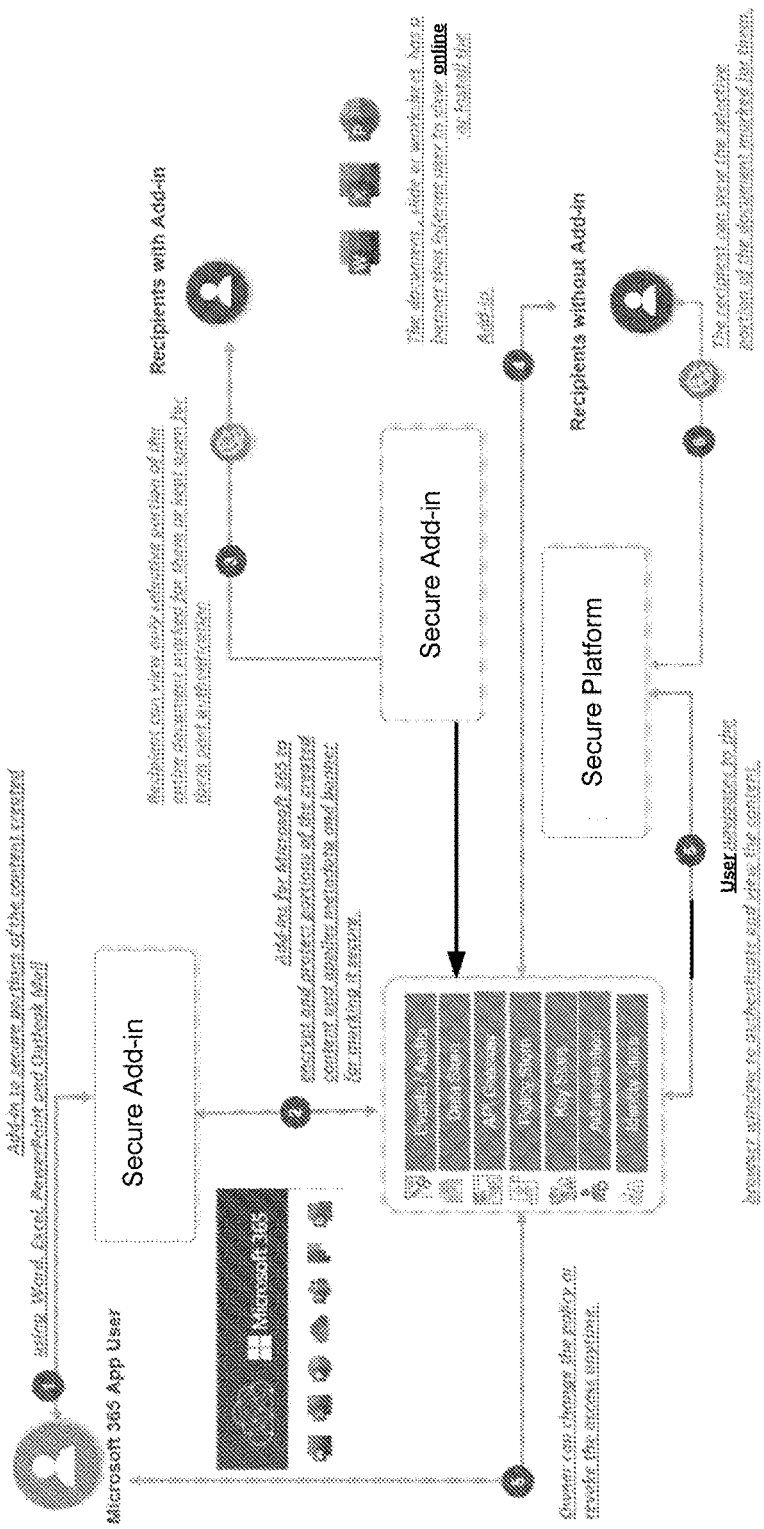
FIG. 25 is a flow chart of operations for accessing selectively protected text using an add-in with particular applications.
Figure 26:
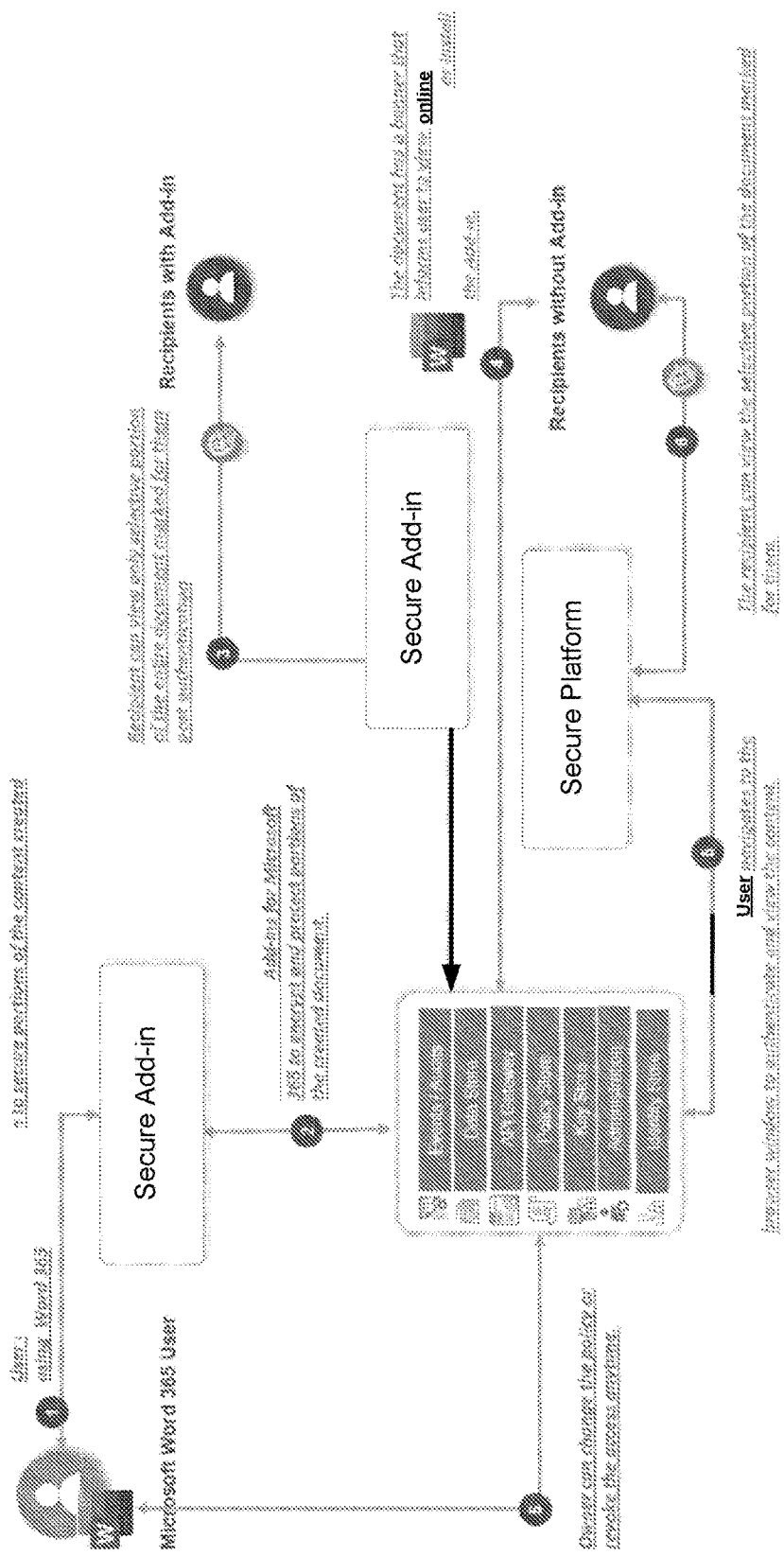
FIG. 26 is a flow chart of operations for accessing selectively protected text using an add-in with a word processor.
Figure 27:
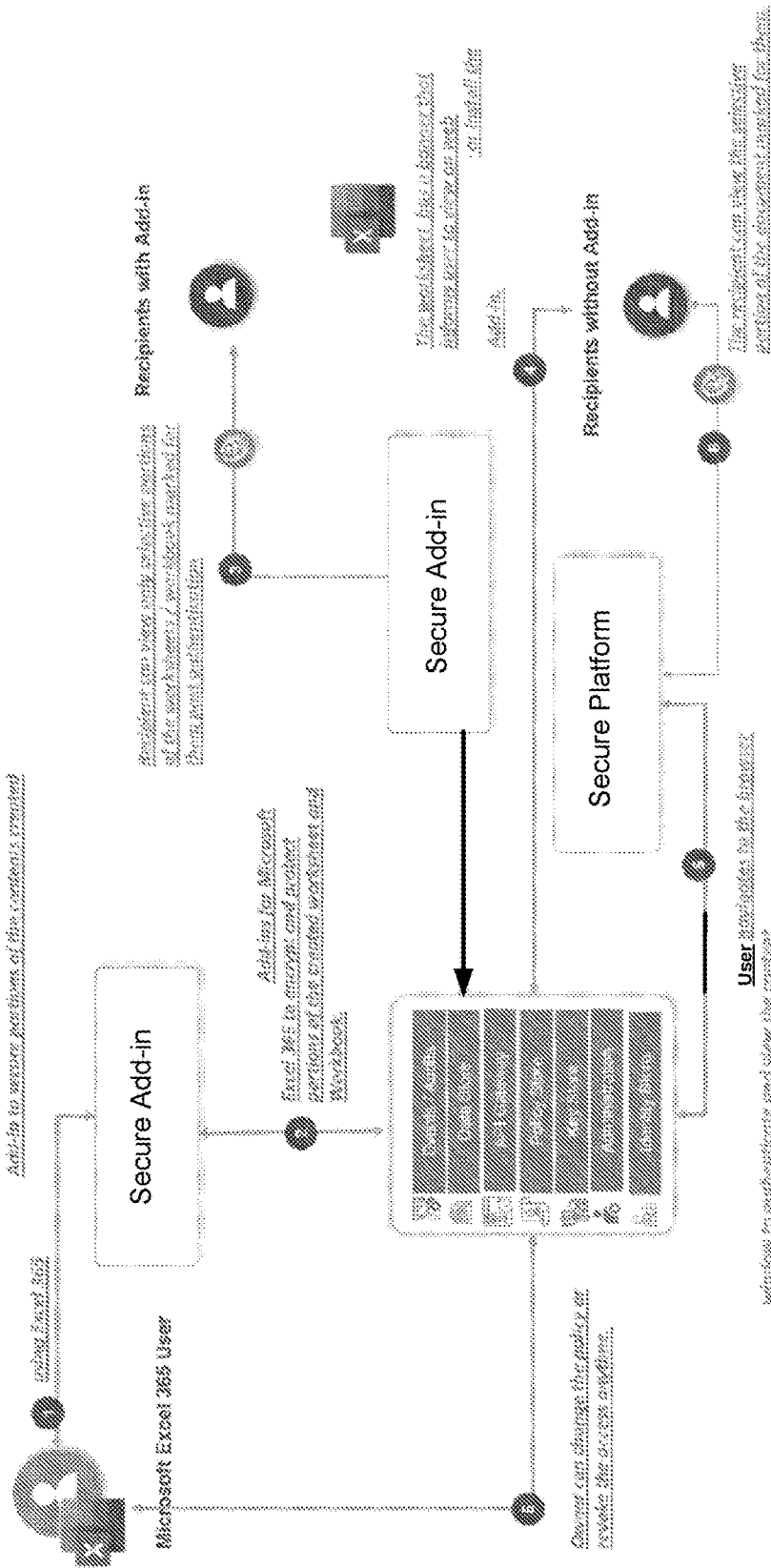
FIG. 27 is a flow chart of operations for accessing selectively protected text using an add-in with a spreadsheet application.
Figure 28:
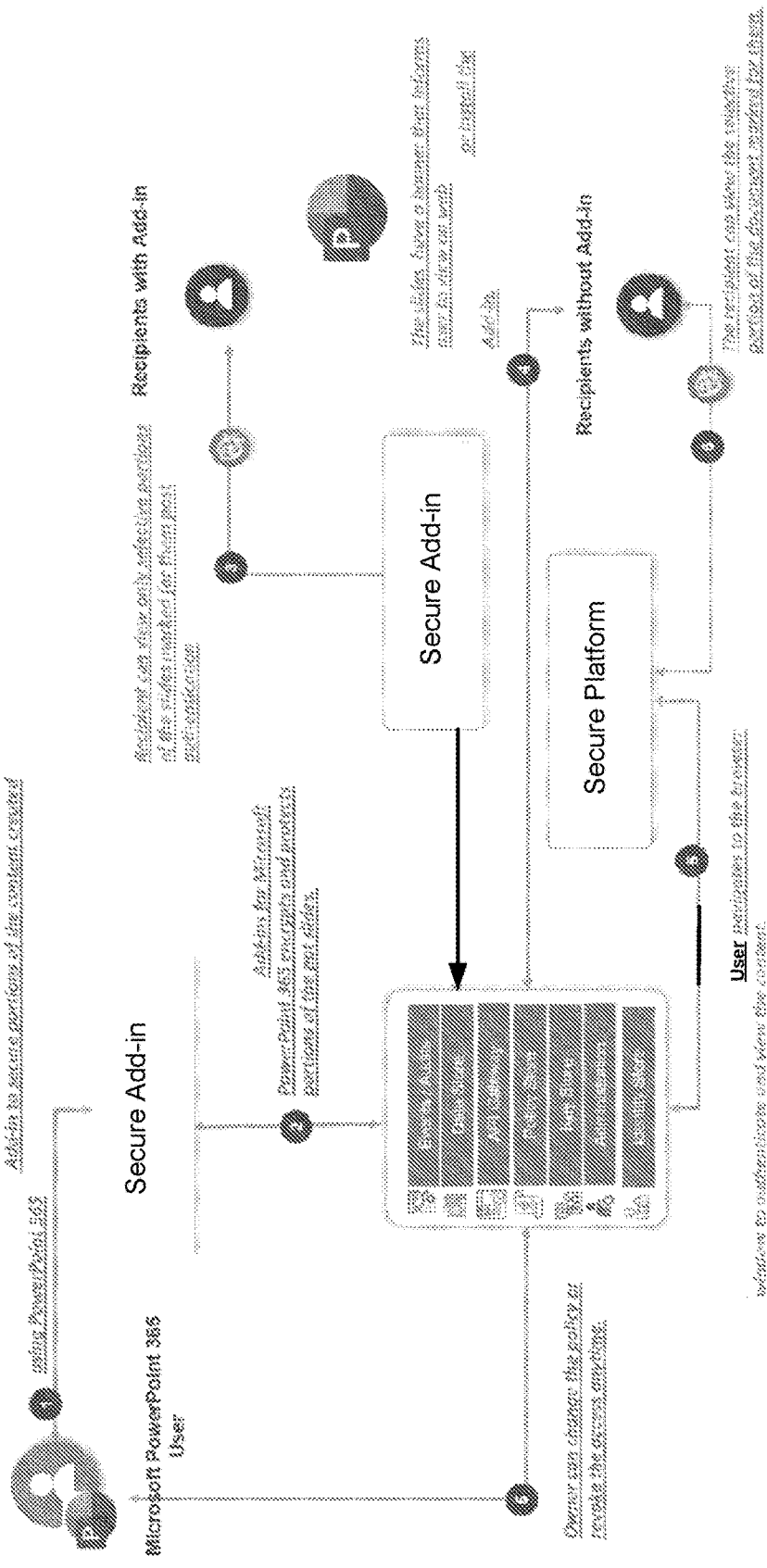
FIG. 28 is a flow chart of operations for accessing selectively protected text using an add-in with a presentation application.
Figure 29:
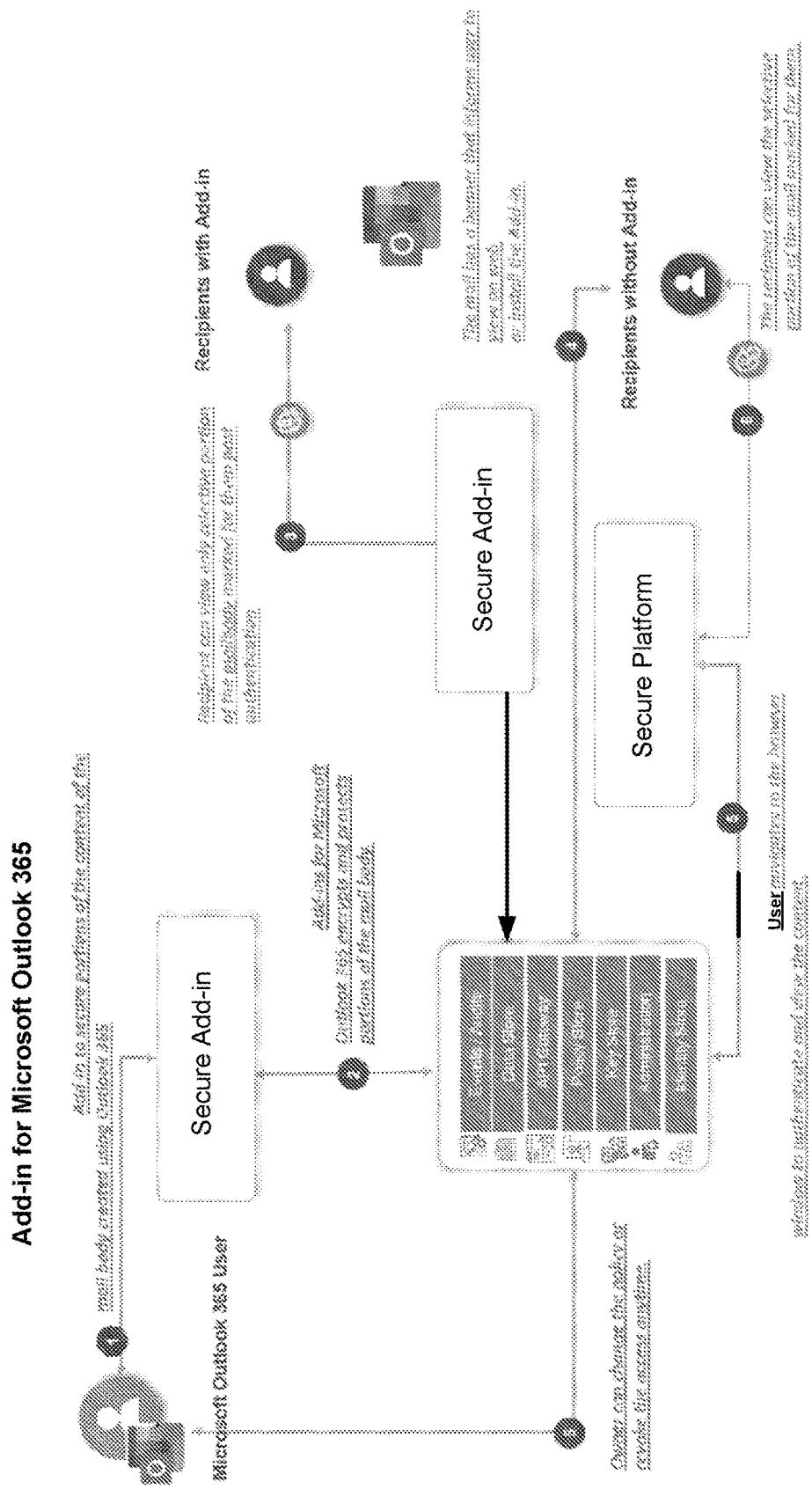
FIG. 29 is a flow chart of operations for accessing selectively protected text using an add-in with an e-mail application.

Referring to FIG. 21 to 29, a series of flowcharts are presented that describes operations associated with creating and using one or more encryption font files with particular computer software suites. For example, FIG. 21 provides a flowchart for securing an electronic communication and presenting the content of the communication (using an encryption font file) as originally created with a cloud based software as a service (SaaS) package (e.g., Microsoft Office 365) that includes a word processor, email platform, spreadsheet application, etc. FIG. 22 provides a flowchart for operations associated with a recipient computing device (that includes an add-in or is absent an add-in) for rendering a readable form of a secure electronic communication. FIG. 23 is a flowchart of operations for accessing selectively protected portions of an electronic communication using an add-in. FIG. 24 is a flowchart of operations for accessing secured portions of an electronic document using a centralized computing device (e.g., a server). FIG. 25 is a flowchart of operations for selective privacy using fonts and an add-in for particular applications (e.g., Microsoft applications). FIG. 26 is a flowchart of operations for selective privacy using fonts and an add-in for a particular word processor application (e.g., Microsoft Word 365). FIG. 27 is a flowchart of operations for selective privacy using fonts and an add-in for a spreadsheet application (e.g., Microsoft Excel 365). FIG. 28 is a flowchart of operations for selective privacy using fonts and an add-in for a presentation application (e.g., Microsoft PowerPoint 365). FIG. 29 is a flowchart of operations for selective privacy using fonts and an add-in for an e-mail application (e.g., Microsoft Outlook 365).

Figure 30:
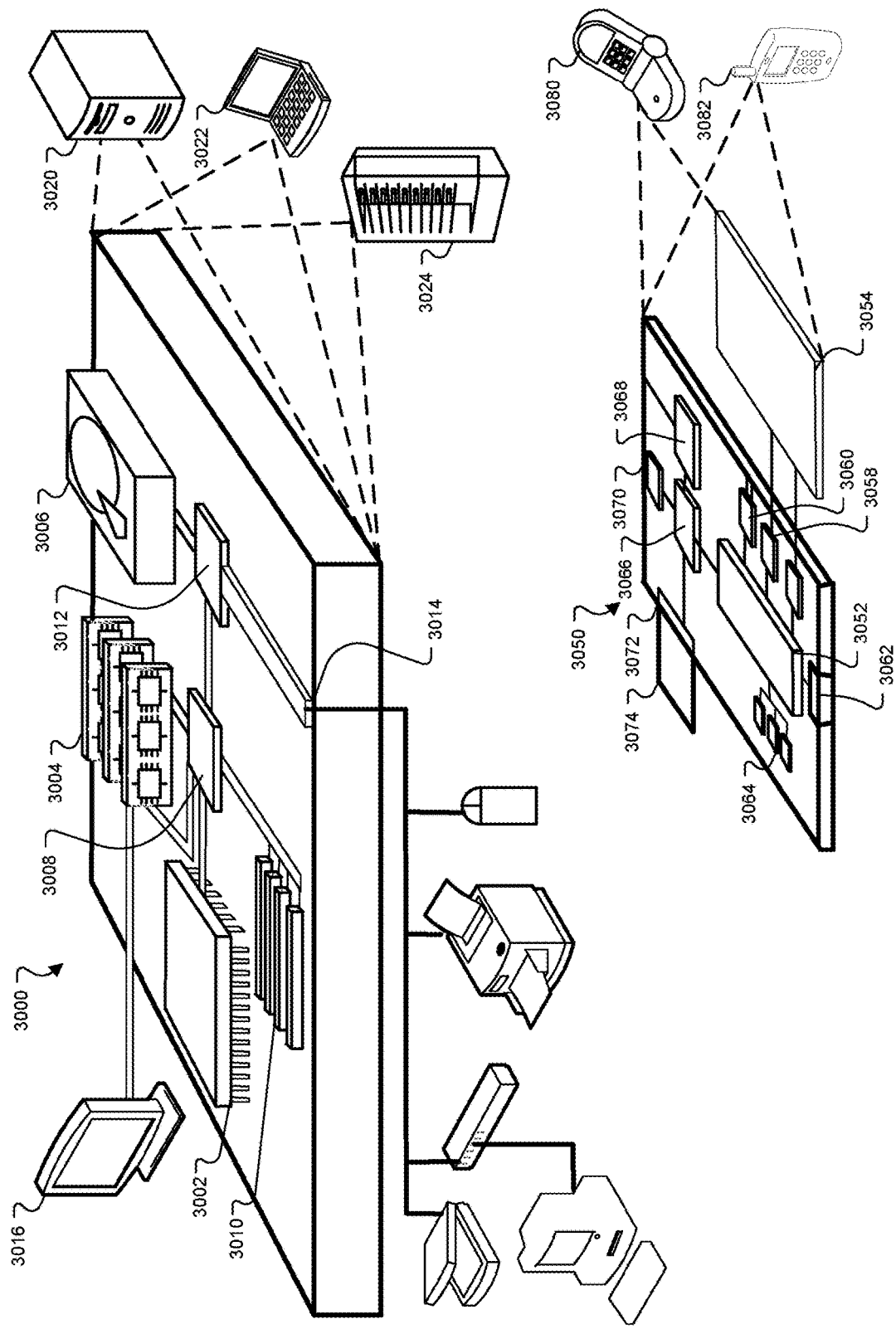
FIG. 30 illustrates an example of a computing device and a mobile computing device that can be used to implement the techniques described here.

FIG. 30 shows an example of example computer device 3000 and example mobile computer device 3050, which can be used to implement the techniques described herein. For example, a portion or all of the operations for creating a secured electronic communication using an encryption font file, providing the font file, rendering the secured communication to an authorized recipient, etc. may be executed by the computer device 3000 and/or the mobile computer device 3050. Computing device 3000 is intended to represent various forms of digital computers, including, e.g., laptops, desktops, workstations, personal digital assistants, servers, blade servers, mainframes, and other appropriate computers. Computing device 3050 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 3000 includes processor 3002, memory 3004, storage device 3006, high-speed interface 3008 connecting to memory 3004 and high-speed expansion ports 3010, and low-speed interface 3012 connecting to low-speed bus 3014 and storage device 3006. Each of components 3002, 3004, 3006, 3008, 3010, and 3012, are interconnected using various busses, and can be mounted on a common motherboard or in other manners as appropriate. Processor 3002 can process instructions for execution within computing device 3000, including instructions stored in memory 3004 or on storage device 3006 to display graphical data for a GUI on an external input/output device, including, e.g., display 3016 coupled to high-speed interface 3008. In other implementations, multiple processors and/or multiple busses can be used, as appropriate, along with multiple memories and types of memory. Also, multiple computing devices 3000 can be connected, with each device providing portions of the necessary operations (e.g., as a server bank, a group of blade servers, or a multi-processor system).

Memory 3004 stores data within computing device 3000. In one implementation, memory 3004 is a volatile memory unit or units. In another implementation, memory 3004 is a non-volatile memory unit or units. Memory 3004 also can be another form of computer-readable medium (e.g., a magnetic or optical disk. Memory 3004 may be non-transitory.)

Storage device 3006 is capable of providing mass storage for computing device 3000. In one implementation, storage device 3006 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 3004, storage device 3006, memory on processor 3002, and the like.)

High-speed controller 3008 manages bandwidth-intensive operations for computing device 3000, while low-speed controller 3012 manages lower bandwidth-intensive operations. Such allocation of functions is an example only. In one implementation, high-speed controller 3008 is coupled to memory 3004, display 3016 (e.g., through a graphics processor or accelerator), and to high-speed expansion ports 3010, which can accept various expansion cards (not shown). In the implementation, low-speed controller 3012 is coupled to storage device 3006 and low-speed expansion port 3014. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 3000 can be implemented in a number of different forms, as shown in the figure. For example, it can be implemented as standard server 3020, or multiple times in a group of such servers. It also can be implemented as part of rack server system 3024. In addition or as an alternative, it can be implemented in a personal computer (e.g., laptop computer 3022.) In some examples, components from computing device 3000 can be combined with other components in a mobile device (not shown), e.g., device 3050. Each of such devices can contain one or more of computing device 3000, 3050, and an entire system can be made up of multiple computing devices 3000, 3050 communicating with each other.

Computing device 3050 includes processor 3052, memory 3064, an input/output device (e.g., display 3054, communication interface 3066, and transceiver 3068) among other components. Device 3050 also can be provided with a storage device, (e.g., a microdrive or other device) to provide additional storage. Each of components 3050, 3052, 3064, 3054, 3066, and 3068, are interconnected using various buses, and several of the components can be mounted on a common motherboard or in other manners as appropriate.

Processor 3052 can execute instructions within computing device 3050, including instructions stored in memory 3064. The processor can be implemented as a chipset of chips that include separate and multiple analog and digital processors. The processor can provide, for example, for coordination of the other components of device 3050, e.g., control of user interfaces, applications run by device 3050, and wireless communication by device 3050.

Processor 3052 can communicate with a user through control interface 3058 and display interface 3056 coupled to display 3054. Display 3054 can be, for example, a TFT LCD (Thin-Film-Transistor Liquid Crystal Display) or an OLED (Organic Light Emitting Diode) display, or other appropriate display technology. Display interface 3056 can comprise appropriate circuitry for driving display 3054 to present graphical and other data to a user. Control interface 3058 can receive commands from a user and convert them for submission to processor 3052. In addition, external interface 3062 can communicate with processor 3042, so as to enable near area communication of device 3050 with other devices. External interface 3062 can provide, for example, for wired communication in some implementations, or for wireless communication in other implementations, and multiple interfaces also can be used.

Memory 3064 stores data within computing device 3050. Memory 3064 can be implemented as one or more of a computer-readable medium or media, a volatile memory unit or units, or a non-volatile memory unit or units. Expansion memory 3074 also can be provided and connected to device 3050 through expansion interface 3072, which can include, for example, a SIMM (Single In Line Memory Module) card interface. Such expansion memory 3074 can provide extra storage space for device 3050, or also can store applications or other data for device 3050. Specifically, expansion memory 3074 can include instructions to carry out or supplement the processes described above, and can include secure data also. Thus, for example, expansion memory 3074 can be provided as a security module for device 3050, and can be programmed with instructions that permit secure use of device 3050. In addition, secure applications can be provided through the SIMM cards, along with additional data, (e.g., placing identifying data on the SIMM card in a non-hackable manner.)

The memory 3064 can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 3064, expansion memory 3074, and/or memory on processor 3052), which can be received, for example, over transceiver 3068 or external interface 3062.

Device 3050 can communicate wirelessly through communication interface 3066, which can include digital signal processing circuitry where necessary. Communication interface 3066 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 3068. In addition, short-range communication can occur, e.g., using a Bluetooth®, WiFi, or other such transceiver (not shown). In addition, GPS (Global Positioning System) receiver module 3070 can provide additional navigation- and location-related wireless data to device 3050, which can be used as appropriate by applications running on device 3050. Sensors and modules such as cameras, microphones, compasses, accelerators (for orientation sensing), etc. may be included in the device.

Device 3050 also can communicate audibly using audio codec 3060, which can receive spoken data from a user and convert it to usable digital data. Audio codec 3060 can likewise generate audible sound for a user, (e.g., through a speaker in a handset of device 3050.) Such sound can include sound from voice telephone calls, can include recorded sound (e.g., voice messages, music files, and the like) and also can include sound generated by applications operating on device 3050.

Computing device 3050 can be implemented in a number of different forms, as shown in the figure. For example, it can be implemented as cellular telephone 3080. It also can be implemented as part of smartphone 3082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
receiving data representing characters of a font present in an electronic communication, wherein the data includes an integer code for each character of the font;
for each of two or more portions of the electronic communication:
applying an operator to the integer code of each character of the font present in the portion of the electronic communication to produce an encrypted integer code, wherein each character of the font is assigned to the encrypted integer code;
sending an encrypted font file for the portion of the electronic communication comprising data representing each character of the font and the respective encrypted integer code, the encrypted font file for the portion of the electronic communication being sent to one or more recipient computing devices for rendering the portion of the electronic communication using the encrypted font file; and
sending, to any of the one or more recipient computing devices of the encrypted font files, the electronic communication with two or more portions of the electronic communication being encrypted with different encrypted integer codes, wherein each encrypted integer code is specific to a respective portion of the electronic communication:
wherein at least one portion of the two or more portions of the electronic communication is renderable as the integer code for each character of the font present in the at least one portion on recipient computing devices having the encrypted font file for the at least one portion.

2. The computing device implemented method of claim 1, wherein the operator is a binary operator that uses an integer key to produce the encrypted integer code.

3. The computing device implemented method of claim 1, wherein the integer code for each character of the font is an integer number representing a Unicode.

4. The computing device implemented method of claim 1, wherein electronic communication is one of an electronic document, an electronic mail message, and a social media posting.

5. The computing device implemented method of claim 2, wherein the binary operator represents an exclusive OR binary operation.

6. The computing device implemented method of claim 2, wherein the integer key is an integer number and the binary operator maps the integer code of each character of the font to the encrypted integer code.

7. The computing device implemented method of claim 1, wherein one or more recipient computing devices are authenticated prior to the encrypted font file being sent.

8. The computing device implemented method of claim 1, wherein a sender of the electronic communication selects each of the one or more recipient computing devices for delivery of the electronic communication.

9. The computing device implemented method of claim 8, wherein the sender of the electronic communication selects a portion of the electronic communication to be readable by one or more of recipient users of the one or more recipient computing devices.

10. The computing device implemented method of claim 9, wherein a plug-in executed by a computing device of the sender receives data representing the one or more recipient users to receive the encrypted font file for presenting the electronic communication.

11. A system comprising:
a computing device comprising:
a memory configured to store instructions; and
a processor to execute the instructions to perform operations comprising:
receiving data representing characters of a font present in an electronic communication, wherein the data includes an integer code for each character of the font;
for each of two or more portions of the electronic communication:
applying an operator to the integer code of each character of the font present in the portion of the electronic communication to produce an encrypted integer code, wherein each character of the font is assigned to the encrypted integer code;
sending an encrypted font file for the portion of the electronic communication comprising data representing each character of the font and the respective encrypted integer code, the encrypted font file for the portion of the electronic communication being sent to one or more recipient computing devices for rendering the portion of the electronic communication using the encrypted font file; and
sending, to any of the recipient computing devices of the encrypted font files, the electronic communication with two or more portions of the electronic communication being encrypted with different encrypted integer codes, wherein each encrypted integer code is specific to a respective portion of the electronic communication;
wherein at least one portion of the two or more portions of the electronic communication is renderable as the integer code for each character of the font present in the at least one portion on recipient computing devices having the encrypted font file for the at least one portion.

12. The system of claim 11, wherein the operator is a binary operator that uses an integer key to produce the encrypted integer code.

13. The system of claim 11, wherein the integer code for each character of the font is an integer number representing a Unicode.

14. The system of claim 11, wherein electronic communication is one of an electronic document, an electronic mail message, and a social media posting.

15. The system of claim 12, wherein the binary operator represents an exclusive OR binary operation.

16. The system of claim 12, wherein the integer key is an integer number and the binary operator maps the integer code of each character of the font to the encrypted integer code.

17. The system of claim 11, wherein one or more one or more recipient computing devices are authenticated prior to the encrypted font file being sent.

18. The system of claim 11, wherein a sender of the electronic communication selects each of the one or more recipient computing devices for delivery of the electronic communication.

19. The system of claim 18, wherein the sender of the electronic communication selects a portion of the electronic communication to be readable by one or more of recipient users of the one or more recipient computing devices.

20. The system of claim 19, wherein a plug-in executed by a computing device of the sender receives data representing the one or more recipient users to receive the encrypted font file for presenting the electronic communication.

21. One or more computer readable media storing instructions that are executable by a processing device, and upon such execution cause the processing device to perform operations comprising:
receiving data representing characters of a font present in an electronic communication, wherein the data includes an integer code for each character of the font;
for each of two or more portions of the electronic communication:
applying an operator to the integer code of each character of the font present in the portion of the electronic communication to produce an encrypted integer code, wherein each character of the font is assigned to the encrypted integer code;
sending an encrypted font file for the portion of the electronic communication comprising data representing each character of the font and the respective encrypted integer code, the encrypted font file for the portion of the electronic communication being sent to one or more recipient computing devices for rendering the portion of the electronic communication using the encrypted font file; and
sending, to any of the recipient computing devices of the encrypted font files, the electronic communication with two or more portions of the electronic communication being encrypted with different encrypted integer codes, wherein each encrypted integer code is specific to a respective portion of the electronic communication;
wherein at least one portion of the two or more portions of the electronic communication is renderable as the integer code for each character of the font present in the at least one portion on recipient computing devices having the encrypted font file for the at least one portion.

22. The one or more computer readable media of claim 21, wherein the operator is a binary operator that uses an integer key to produce the encrypted integer code.

23. The one or more computer readable media of claim 21, wherein the integer code for each character of the font is an integer number representing a Unicode.

24. The one or more computer readable media of claim 21, wherein electronic communication is one of an electronic document, an electronic mail message, and a social media posting.

25. The one or more computer readable media of claim 22, wherein the binary operator represents an exclusive OR binary operation.

26. The one or more computer readable media of claim 22, wherein the integer key is an integer number and the binary operator maps the integer code of each character of the font to the encrypted integer code.

27. The one or more computer readable media of claim 21, wherein one or more recipient computing devices are authenticated prior to the encrypted font file being sent.

28. The one or more computer readable media of claim 21, wherein a sender of the electronic communication selects each of the one or more recipient computing devices for delivery of the electronic communication.

29. The one or more computer readable media of claim 28, wherein the sender of the electronic communication selects a portion of the electronic communication to be readable by one or more of recipient users of the one or more recipient computing devices.

* * * * *